(12) United States Patent
Abe et al.

(10) Patent No.: US 11,407,925 B2
(45) Date of Patent: Aug. 9, 2022

(54) ADHESIVE SHEET AND METHOD OF APPLYING ADHESIVE SHEET TO ROUGH SURFACE

(71) Applicant: 3M INNOVATIVE PROPERTIES COMPANY, St. Paul, MN (US)

(72) Inventors: Hidetoshi Abe, Yamagata (JP); Kengo Imamura, Tokyo (JP); Katsuya Ono, Yamagata (JP); Yoshihiko Takeda, Miyagi (JP); Takeo Yamamoto, Yamagata (JP)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 151 days.

(21) Appl. No.: 16/604,104

(22) PCT Filed: Apr. 4, 2018

(86) PCT No.: PCT/IB2018/052336
§ 371 (c)(1),
(2) Date: Oct. 9, 2019

(87) PCT Pub. No.: WO2018/189626
PCT Pub. Date: Oct. 18, 2018

(65) Prior Publication Data
US 2021/0009863 A1   Jan. 14, 2021

(30) Foreign Application Priority Data

Apr. 10, 2017 (JP) .............................. JP2017-077645
Feb. 19, 2018 (JP) .............................. JP2018-026922

(51) Int. Cl.
*C09J 7/38*        (2018.01)
*C09J 7/25*        (2018.01)
(Continued)

(52) U.S. Cl.
CPC .............. *C09J 7/385* (2018.01); *C08F 220/06* (2013.01); *C08F 220/1808* (2020.02);
(Continued)

(58) Field of Classification Search
CPC ..... C09J 7/385; C09J 7/255; C09J 7/29; C09J 7/38; C09J 133/08; C09J 2301/124;
(Continued)

(56) References Cited

U.S. PATENT DOCUMENTS 3,301,741 A   1/1967   Henrickson
3,314,838 A   4/1967   Erwin
(Continued)

FOREIGN PATENT DOCUMENTS

GB   1541311      2/1979
GB   H07-216320   8/1995
(Continued)

OTHER PUBLICATIONS

International Search Report for PCT International Application No. PCT/IB2018/052336, dated Jul. 13, 2018, 5 pages.
(Continued)

*Primary Examiner* — Patricia L. Nordmeyer
(74) *Attorney, Agent, or Firm* — Vincent Pham

(57) ABSTRACT

An adhesive sheet of an embodiment of the present disclosure is an adhesive sheet including: a rigid resin film having a thickness of 80 micrometers to 500 micrometers, and a first pressure sensitive adhesive layer being disposed on or above a surface of the rigid resin film, wherein the first pressure sensitive adhesive layer includes elastic resin microspheres having a volume average particle diameter of 110 micrometers or greater and a tacky binder, and the first pressure sensitive adhesive layer has an uneven surface due to the presence of the microspheres.

18 Claims, 5 Drawing Sheets

(51) Int. Cl.
*C08F 220/18* (2006.01)
*C08F 220/06* (2006.01)
*C08K 3/22* (2006.01)
*C09J 133/08* (2006.01)
*C09J 7/29* (2018.01)
*C08K 7/16* (2006.01)
*C08F 236/20* (2006.01)

(52) U.S. Cl.
CPC .............. *C08F 236/20* (2013.01); *C08K 3/22* (2013.01); *C09J 7/255* (2018.01); *C09J 7/29* (2018.01); *C09J 7/38* (2018.01); *C09J 133/08* (2013.01); *C08K 7/16* (2013.01); *C08K 2003/2237* (2013.01); *C09J 2301/124* (2020.08); *C09J 2301/16* (2020.08); *C09J 2301/20* (2020.08); *C09J 2301/302* (2020.08); *C09J 2301/408* (2020.08); *C09J 2301/412* (2020.08); *C09J 2400/163* (2013.01); *C09J 2433/00* (2013.01); *C09J 2467/001* (2013.01); *C09J 2467/006* (2013.01); *Y10T 428/2891* (2015.01)

(58) Field of Classification Search
CPC ................ C09J 2301/16; C09J 2301/20; C09J 2301/302; C09J 2301/408; C09J 2301/412; C09J 2400/163; C09J 2433/00; C09J 2467/001; C09J 2467/006; C08F 220/06; C08F 220/1808; C08F 236/20; C08K 3/22; C08K 7/16; C08K 2003/2237; Y10T 428/2891
See application file for complete search history.

(56) References Cited

U.S. PATENT DOCUMENTS

| | | |
|---|---|---|
| 3,554,835 A | 1/1971 | Morgan |
| 4,049,483 A | 9/1977 | Loder |
| 4,054,697 A | 10/1977 | Reed |
| 4,151,319 A | 4/1979 | Sackoff |
| 4,376,151 A | 3/1983 | Parrotta |
| 4,556,595 A | 12/1985 | Ochi |
| 4,735,837 A | 4/1988 | Miyasaka |
| 4,994,322 A | 2/1991 | Delgado |
| 5,008,139 A | 4/1991 | Ochi |
| 5,141,790 A | 8/1992 | Calhoun |
| 5,196,246 A | 3/1993 | Kauss |
| 5,264,467 A | 11/1993 | DiStefano |
| 5,296,277 A | 3/1994 | Wilson |
| 5,362,516 A | 11/1994 | Wilson |
| 5,607,763 A | 3/1997 | Matsuda |
| 5,795,636 A | 8/1998 | Keller |
| 5,897,930 A | 4/1999 | Calhoun |
| 6,015,606 A | 1/2000 | Abe |
| 6,194,064 B1 | 2/2001 | Keely |
| 2008/0202662 A1* | 8/2008 | Husemann ................ B32B 7/12 156/60 |
| 2008/0311369 A1* | 12/2008 | Yokoyama ................ C09J 7/29 428/220 |
| 2010/0009182 A1 | 1/2010 | Kato |

FOREIGN PATENT DOCUMENTS

| | | |
|---|---|---|
| GB | 2344061 | 5/2000 |
| JP | 2002-169470 | 6/2002 |
| JP | 2004/225022 | 8/2004 |
| JP | 2014-172320 | 9/2014 |
| JP | 2015-058548 | 3/2015 |
| JP | 5933957 | 5/2016 |
| JP | 2017-197604 | 11/2017 |
| WO | WO 1994-022971 | 10/1994 |
| WO | WO 1996-011116 | 4/1996 |
| WO | WO 1997-020008 | 6/1997 |
| WO | WO 1998-018878 | 5/1998 |
| WO | WO 2001-026893 | 4/2001 |
| WO | WO 2011-149037 | 12/2011 |
| WO | WO 2017-100085 | 6/2017 |

OTHER PUBLICATIONS

Zhiyuan, Wen et al., Plastic forming processes and apparatus, Beijing Institute of Technology Press, Nov. 2012, pp. 72.

* cited by examiner

ADHESIVE SHEET AND METHOD OF APPLYING ADHESIVE SHEET TO ROUGH SURFACE

CROSS REFERENCE TO RELATED APPLICATIONS

This application is a national stage filing under 35 U.S.C. 371 of PCT/IB2018/052336, filed Apr. 4, 2018, which claims the benefit of Japanese Application No. 2017-077645, filed Apr. 10, 2017 and Japanese Application No. JP 2018-026922, filed Feb. 19, 2018, the disclosure of which is incorporated by reference in their entirety herein.

TECHNICAL FIELD

The present disclosure relates to an adhesive sheet and a method of applying the adhesive sheet to a rough surface.

BACKGROUND ART

Adhesive sheets have been used in various purposes and, for example, an adhesive graphic sheet having a graphic image has been used for exterior decoration and interior decoration or advertisement purposes. Typical adhesive sheets that are applied to a base material surface having an uneven shape has pliability that makes it possible to conform to the shape of the base material surface to achieve excellent adhesion.

Patent Document 1 (JP 06-287525 A) describes "a pressure sensitive adhesive decorative film formed by applying a pressure sensitive adhesive onto a surface of a film backing wherein the hardness of the film is within the range between H and 3B determined by a pencil scratch test according to JIS K 5400 and the pressure sensitive adhesive contains pressure sensitive adhesive microspheres with an elastic modulus ranging from $1\times10^4$ to $1\times10^6$ dyne/$cm^2$".

Patent Document 2 (JP-A-H09-157606) describes "an adhesive sheet including: I) a backing layer, and II) an adhesive layer which is formed on the backing layer and contain tacky microspheres and an adhesive polymer, wherein a) the adhesive layer has convex adhesive parts containing a cluster of at least two of the tacky adhesive microspheres and the adhesive polymer, and b) a contact area rate between the adhesive layer and a plate surface is from 20 to 90% when the contact area rate is measured by adhering the adhesive sheet to a flat glass plate surface under the pressure of 1 kg/$cm$".

Patent Document 3 (JP-A-H08-113768) describes "an adhesive film for decoration including an adhesive applied on a surface of a film substrate, wherein the adhesive has microspheres, wherein the microspheres have an elastic modulus of $1\times10^4$ to $1\times10^7$ dyn/$cm^2$; and a particle diameter of 10 to 100 micrometers (as a volume average diameter)".

PATENT LITERATURE

Patent Document 1: JP 6-287525 A
Patent Document 2: JP 9-157606 A
Patent Document 3: JP 8-113768 A

SUMMARY OF INVENTION

Adhesive sheets that exhibit smooth appearance even after being adhered to a rough surface, such as mortar, concrete, siding board, stucco, and wallpaper which has been subjected to emboss finishing, have been demanded.

Furthermore, adhesive sheets desirably exhibit sufficient adhesive force even for smooth surfaces, such as metal plates and resin films. For example, when such adhesive sheets are used as graphic sheets, it is possible to apply graphic sheets on various surfaces while the quality of the graphic images are maintained.

The present disclosure provides an adhesive sheet that can adhere to both a smooth surface and a rough surface by the sufficient adhesive force thereof and that exhibits a smooth appearance after being adhered regardless of the surface to which the adhesive sheet was applied.

Solution to Problem

According to an embodiment of the present disclosure, an adhesive sheet including: a rigid resin film having a thickness of 80 micrometers to 500 micrometers, and a first pressure sensitive adhesive layer being disposed on or above a surface of the rigid resin film, wherein the first pressure sensitive adhesive layer includes elastic resin microspheres having a volume average particle diameter of 110 micrometers or greater and a tacky binder, and the first pressure sensitive adhesive layer has an uneven surface due to the presence of the microspheres is provided.

According to another embodiment of the present disclosure, a method of applying an adhesive sheet on a rough surface, the method including: providing an adhesive sheet, the adhesive sheet including: a rigid resin film having a thickness of 80 micrometers to 500 micrometers, and a first pressure sensitive adhesive layer being disposed on or above a surface of the rigid resin film, wherein the first pressure sensitive adhesive layer includes elastic resin microspheres having a volume average particle diameter of 110 micrometers or greater and a tacky binder, and the first pressure sensitive adhesive layer has an uneven surface due to the presence of the microspheres; and applying the adhesive sheet on a rough surface, the adhesive sheet exhibiting a smooth appearance after being applied on the rough surface is provided.

Advantageous Effects of Invention

By combining a first pressure sensitive adhesive layer having an uneven surface due to the presence of the elastic resin microspheres having relatively large particle diameters and a rigid resin film layer, the adhesive sheet of the present disclosure exhibits sufficient adhesive force to both a smooth surface and a rough surface and can exhibit a smooth appearance after being adhered regardless of the surface to which the adhesive sheet was applied.

Note that the above descriptions should not be construed to be a disclosure of all of the embodiments and benefits of the present invention.

DESCRIPTION OF EMBODIMENTS

Hereinafter, representative embodiments of the present invention will be described in more detail. However, the present invention is not limited to these embodiments.

In the present disclosure, the term "(meth)acrylic" refers to acrylic or methacrylic, and the term "(meth)acrylate" refers to acrylate or methacrylate.

In the present disclosure, "pressure sensitive adhesion" refers to the characteristic of a material or composition that is permanently adhesive in the temperature range of usage, such as from 0° C. to 50° C., and that adheres to various surfaces with light pressure and does not exhibit a phase change (from liquid to solid).

An adhesive sheet of an embodiment contains a rigid resin film having a thickness of 80 micrometers to 500 micrometers, and a first pressure sensitive adhesive layer being disposed on or above a surface of the rigid resin film, the first pressure sensitive adhesive layer containing elastic resin microspheres having a volume average particle diameter of 110 micrometers or greater and a tacky binder. The first pressure sensitive adhesive layer has an uneven surface due to the presence of the microspheres. By bringing the uneven surface of the first pressure sensitive adhesive layer into contact with an adherend surface and, as necessary, by applying pressure, the adhesive sheet is thereby adhered to the adherend.

In some embodiments, the gap in the uneven surface of the first pressure sensitive adhesive layer has a shape and depth that are appropriate for air releasability, thus, it is possible to easily apply the adhesive sheet onto a smooth surface.

Figure 1A:
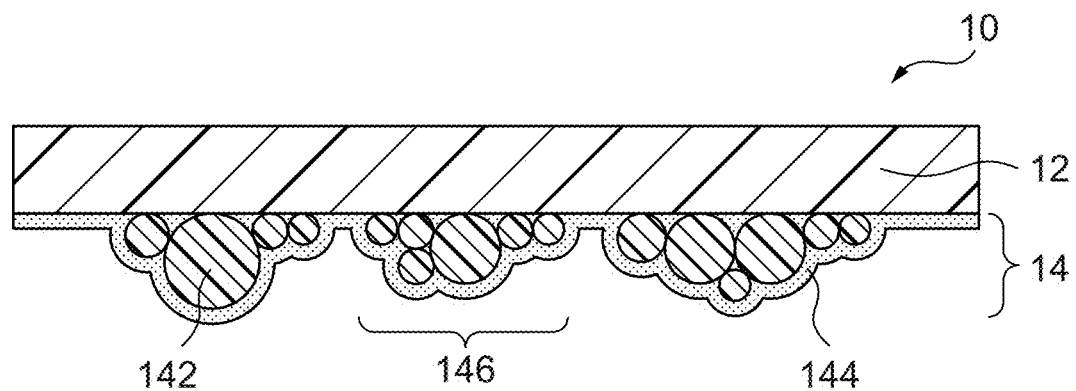
FIG. 1A is a schematic cross-sectional view of an adhesive sheet of an embodiment of the present disclosure.
Figure 1B:
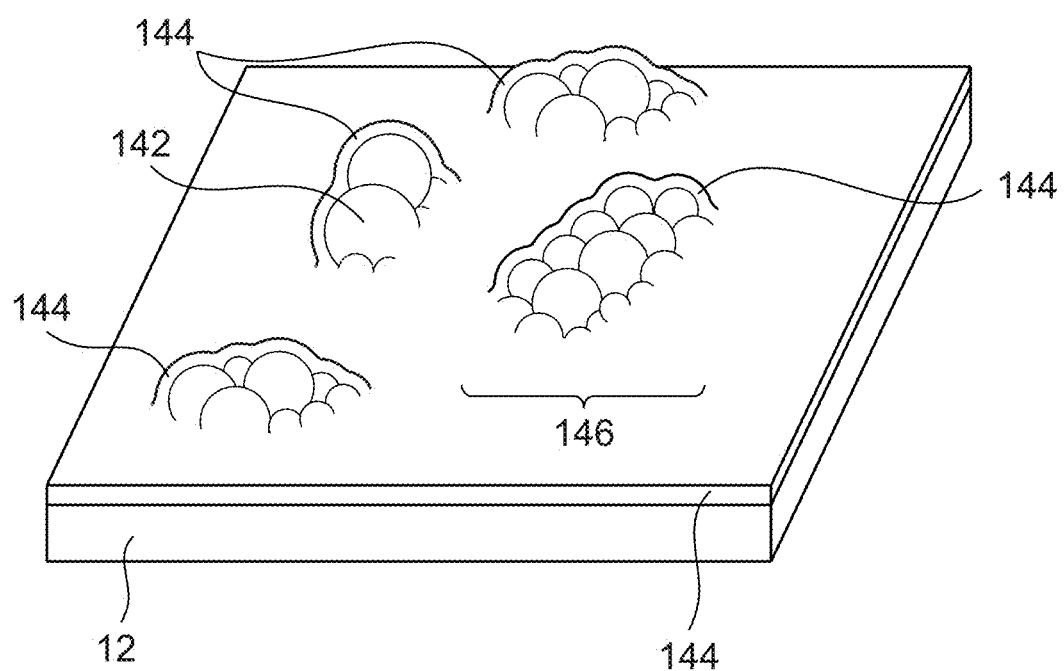
FIG. 1B is a schematic perspective view of the adhesive sheet of an embodiment of the present disclosure.

FIGS. 1A and 1B illustrate a schematic cross-sectional view and a schematic perspective view of the adhesive sheet 10 according to an embodiment of the present disclosure, respectively. The adhesive sheet 10 has a rigid resin film 12 and a first pressure sensitive adhesive layer 14 disposed on a surface (in FIG. 1A, a bottom surface) of the rigid resin film 12. The first pressure sensitive adhesive layer 14 contains elastic resin microspheres 142 and a tacky binder 144.

The rigid resin film functions as a support of the first pressure sensitive adhesive layer and prevents deformation of the adhesive sheet by resisting the strain generated by deformation of microspheres during application of the adhesive sheet, thereby contributing to maintain the appearance of the adhesive sheet smooth. When the adherend has an uneven surface, the rigid resin film suppresses excessive conforming of the adhesive sheet to the uneven surface during adhesion and prevents the protrusions of the uneven surface from penetrating the adhesive sheet. When the adhesive sheet is applied to a vertical surface, the rigid resin film can prevent releasing caused by the weight of the adhesive sheet by suppressing deformation of the adhesive sheet.

The thickness of the rigid resin film is approximately 80 micrometers or greater and approximately 500 micrometers or less. In some embodiments, the thickness of the rigid resin film is approximately 100 micrometers or greater or approximately 150 micrometers or greater but approximately 400 micrometers or less or approximately 300 micrometers or less. By setting the thickness of the rigid resin film to be within the range described above, the smoothness of appearance of the adhesive sheet can be maintained during adhesion by the combination with the rigidity of the film itself. When the thickness of the rigid resin film differs within the plane, the thickness of the rigid resin film refers to the minimum thickness of the rigid resin film in the present disclosure.

In some embodiments, the yield modulus of the rigid resin film is approximately 10 MPa or greater, approximately 15 MPa or greater, or approximately 20 MPa or greater, but approximately 300 MPa or less, approximately 250 MPa or less, or approximately 200 MPa or less. By setting the yield modulus of the rigid resin film to be within the range described above, the smoothness of appearance of the adhesive sheet can be maintained during adhesion by the combination with the thickness of the film. The yield modulus is defined as a modulus of elasticity at the yield point when a test piece is produced by cutting a rigid resin film into a rectangular shape with a width of 15 mm and a length of 100 mm and the elongation properties of the test piece is measured using a tensile tester in accordance with JIS K 7127 under the condition at 20° C., the distance between grips of 50 mm, and the tensile speed of 300 mm/min.

In some embodiments, the product of the yield modulus and the thickness of the rigid resin film is approximately $0.9 \times 10^4$ N/m or greater, approximately $1.0 \times 10^4$ N/m or greater, or approximately $1.5 \times 10^4$ N/m or greater, but approximately $5 \times 10^4$ N/m or less, approximately $4 \times 10^4$ N/m or less, or approximately $3 \times 10^4$ N/m or less. The product of the yield modulus and the thickness is proportional to the bending stiffness of the rigid resin film. By setting the product of the yield modulus and the thickness of the rigid resin film to be within the range described above, the rigid resin film can have sufficient bending stiffness to maintain the smoothness of appearance of the adhesive sheet during adhesion.

In some embodiments, the tensile strength at 2% strain of the rigid resin film is approximately 40 N/25 mm or greater, approximately 45 N/25 mm or greater, or approximately 50 N/25 mm or greater. By setting the tensile strength at 2% strain of the rigid resin film to be within the range described above, the smoothness of appearance of the adhesive sheet can be maintained during adhesion, and the adhesive sheet can be removed without causing rupture or breakage of the adhesive sheet and without leaving adhesive residue caused thereby. The tensile strength at 2% strain is defined as a tensile strength at 2% strain when a test piece is produced by cutting a rigid resin film into a rectangular shape with a width of 25 mm and a length of 100 mm and subjected to measurement using a tensile tester under the condition at 20° C., the distance between grips of 50 mm, and the tensile speed of 300 mm/min.

The raw material of the rigid resin film is not particularly limited; however, examples thereof include polyesters such as polyethylene terephthalate and polyethylene naphthalate, polyolefins such as polyethylene and polypropylene, polycarbonates, acrylic resins, fluororesins such as polytetrafluoroethylene and polyvinylidene fluoride. A polyester film is advantageously used as the rigid resin film since the polyester film has high yield modulus and strength, has excellent weather resistance, and is relatively inexpensive.

The rigid resin film may have undergone surface treatment, such as embossing treatment, primer treatment, corona treatment, and plasma treatment, for decorative purpose or the like. By performing surface treatment, the adhesion between the first pressure sensitive adhesive layer and/or the second pressure sensitive adhesive layer and the rigid resin film can be enhanced. Wettability of the rigid resin film surface is controlled by the surface treatment, thereby making it possible to promote cluster formation of microspheres as described below.

The rigid resin film may be a stretched film or an unstretched film. The rigidity and tensile strength of the film can be advantageously enhanced by using a stretched film, especially a biaxially stretched film, as the rigid resin film.

The rigid resin film may contain other optional components, such as fillers, colorants, UV absorbing agents, and antioxidants.

The first pressure sensitive adhesive layer may be directly arranged on a rigid resin film, or may be arranged above the rigid resin film, i.e. on another layer on the rigid film, for example, a decorative layer such as a printed layer and a metal deposited layer, a metal layer, and an additional resin film layer.

The first pressure sensitive adhesive layer contains elastic resin microspheres having a volume average particle diameter of 110 micrometers or greater and a tacky binder. In the present disclosure, "elastic resin microsphere" is defined as a spherical raw material that is formed from a resin. Typically, the microspheres exhibit rubber elasticity as a whole. Due to the presence of the microspheres, the first pressure sensitive adhesive layer has an uneven surface on the adhesive surface thereof (a surface that faces the surface of an adherend). The microspheres deform at the time of adhesion to the adhesive sheet, e.g. the microspheres are collapsed in the thickness direction of the adhesive sheet. This increases the contact area between the adherend surface and the first pressure sensitive adhesive layer, and thus the adhesive sheet is adhered to the adherend surface. Since the volume average particle diameter of the microspheres is relatively large, high adhesive force can be achieved by utilizing the elasticity of the microspheres even when the contact area with the adherend is relatively small, similar to the case where a thick pressure sensitive adhesive layer exhibits excellent adhesive force. The uneven surface formed with microspheres and/or clusters of microspheres described below can make the contact area to a rough surface larger due to its relatively large difference of height, thereby enhancing the adhesive force.

Figure 2:
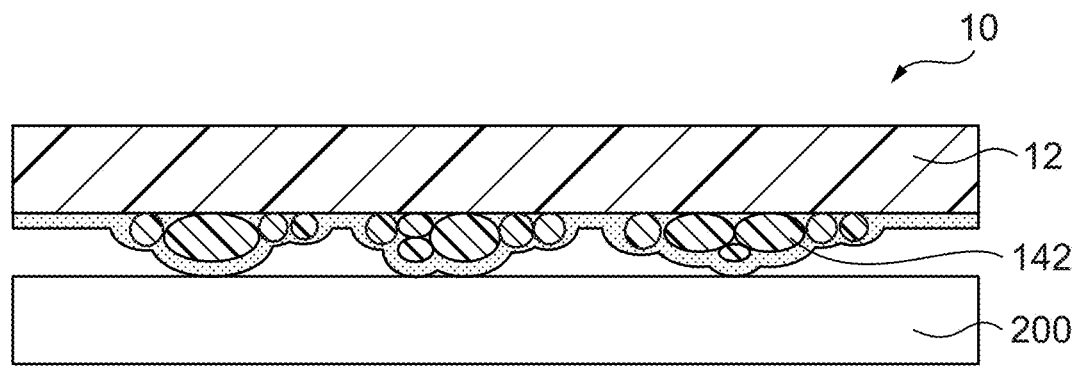
FIG. 2 is a schematic cross-sectional view in the case where the adhesive sheet of an embodiment of the present disclosure is applied to a base material having a smooth surface.

FIG. 2 is a schematic cross-sectional view in the case where the adhesive sheet 10 of an embodiment of the present disclosure is applied to a base material 200 having a smooth surface. The microspheres 142 deform when applied to the base material 200 since the microspheres 142 have elasticity, and increase the contact area of the first pressure sensitive adhesive layer 14 to the base material 200. By this, the adhesive sheet 10 exhibits high adhesive force to a smooth surface as well as to a rough surface.

In an embodiment, the microspheres are tacky. By using tacky microspheres, adhesive force can be further enhanced.

The volume average diameter of the microspheres is 110 micrometers or greater. In some embodiments, the volume average diameter of the microspheres is approximately 125 micrometers or greater or approximately 130 micrometers or greater but approximately 500 micrometers or less or approximately 300 micrometers or less. The first pressure sensitive adhesive layer containing the microspheres having the volume average diameter within the range described above can suitably conform to the adherend surface and can exhibit high adhesive force. The volume average particle diameter of the microspheres can be measured by using a laser diffraction particle size analyzer, such as Beckman Coulter LS230.

The compressive elastic modulus of the microspheres at 20° C. is preferably approximately 1 kPa or greater but approximately 100 kPa or less. By setting the compressive elastic modulus of the microspheres to be within the range described above, the microspheres or the clusters of microspheres can be deformed in a manner which is advantageous for adhesion to a rough surface. The compressive elastic modulus of the microspheres is a measured value at 20° C. determined by producing a sample obtained by forming microspheres having a predetermined shape, such as cylindrical shape, and performing measurement using a measurement instrument for viscoelasticity, such as RSA II viscoelasticity spectrometer manufactured by Rheometrics, under the following conditions: frequency: 1 rad/sec; compression strain mode; measurement temperature range: −80° C. to 150° C.; rate of temperature increase: 5.0° C./min.

The microspheres may contain an acrylic resin, silicone resin, polyurethane, vinyl acetate-based resin, fluororesin, polyamide, polyvinyl chloride, polystyrene, phenolic resin, epoxy resin, styrene-butadiene-styrene block copolymer, styrene-ethylene-butylene-styrene block copolymer, styrene-isoprene-styrene block copolymer, nitrile rubber, chloroprene rubber, or natural rubber. An acrylic resin has high weather resistance and is advantageously used since controlling of the adhesivity is facilitated.

The microspheres may contain a crosslinked resin or an uncrosslinked resin. In an embodiment, the microspheres contain a crosslinked resin. Since the microspheres containing a crosslinked resin exhibit excellent shape retaining property and durability, repeated adhesion and detaching of the adhesive sheet are made possible.

The microspheres may contain solid particles, hollow particles having one or a plurality of gaps therein, or a mixture of these. In an embodiment, the microspheres are solid particles.

The microspheres can be produced by publicly known polymerization methods, such as suspension polymerization, emulsion polymerization, and seed polymerization. For example, microspheres containing acrylic resin can be produced by suspension polymerization by the following procedure. Deionized water, a monomer mixture, a radical polymerization initiator, and optional additives are placed in a reaction equipment with mechanical stirrer, inside of the reaction equipment is purged with an inert gas such as a nitrogen gas, and the mixture is heated to a predetermined temperature while being stirred to perform a polymerization reaction of an acrylic monomer. The stirring rate is typically from 10 to 700 rpm, the reaction temperature is typically from 30 to 120° C., and the reaction time is typically from several hours to several tens of hours.

The monomer mixture typically contains alkyl acrylate (e.g. ethyl acrylate, n-butyl acrylate, n-hexyl acrylate, 2-ethylhexyl acrylate, isooctyl acrylate, and isononyl acrylate) and carboxylic acid having an ethylenically unsaturated bond (e.g. acrylic acid, methacrylic acid, itaconic acid, and maleic acid). One type each of alkyl acrylate and carboxylic acid having an ethylenically unsaturated bond may be used, or a combination of two or more types of alkyl acrylate(s) and/or carboxylic acid(s) having an ethylenically unsaturated bond may be used. The carboxylic acid having an ethylenically unsaturated bond is typically used in an amount of approximately 1 part by mass or greater but approximately 10 parts by mass or less per 100 parts by mass of alkyl (meth)acrylate. As a crosslinking agent, a polyfunctional monomer, such as 1,4-butanediol diacrylate and divinylbenzene, may be added to the mixture to crosslink the acrylic resin. The used amount of the crosslinking agent is typically approximately 0.01 parts by mass or greater or approximately 0.02 parts by mass or greater but approximately 0.5 parts by mass or less or approximately 0.1 parts by mass or less per 100 parts by mass of the monomer mixture. The production method of microspheres containing an acrylic resin is, for example, disclosed in U.S. Pat. No. 4,994,322. The microspheres obtained by polymerization may be separated by filtration or may be used in the state of an aqueous dispersion liquid containing microspheres after the termination of the reaction.

The glass transition temperature (Tg) of the resin contained in the microspheres is typically lower than room temperature and, for example, is approximately −90° C. or higher, approximately −70° C. or higher, or approximately −50° C. or higher, but approximately 0° C. or lower, approximately −10° C. or lower, or approximately −20° C. or lower. The glass transition temperature can be adjusted by the type and the compounded ratio of monomers contained in the monomer mixture.

The first pressure sensitive adhesive layer contains a tacky binder. The tacky binder imparts adhesive properties to the first pressure sensitive adhesive layer and suppresses shedding of the microspheres from the adhesive sheet. In FIGS. 1A and 1B, microspheres 142 or clusters 146 of microspheres 142 described below are dispersed in a binder 144 and are fixed to an adhesive sheet 10 via the binder 144. In the embodiment illustrated in FIGS. 1A and 1B, the surface of the microspheres 142 and the clusters 146 are covered with the tacky binder 144.

As the tacky binder, publicly known resins, such as acrylic resins, polyurethanes, polyolefins, polyesters, rubber-based resins, silicone-based resins, vinyl acetate-based resins, can be used. The tacky binder may contain a tackifier or may be crosslinked. In an embodiment, it is advantageous for at least one part of the region, which faces the adherend surface, of the microspheres to be covered with the tacky binder from the perspective of utilizing high adhesive force of the binder. In an embodiment, the binder is an acrylic adhesive. When the binder is an acrylic adhesive and the microspheres contain an acrylic resin, shedding of the microspheres can be securely prevented due to high chemical affinity of the binder and the microspheres. The "tacky (tackiness)" in the present disclosure refers to properties of a raw material exhibiting adhesion when only a little pressure is applied at room temperature for a short period of time, and is interchangeably used with the term "pressure sensitive adhesive".

In an embodiment, the microspheres are contained in the first pressure sensitive adhesive layer in an amount of approximately 5 parts by mass or greater, approximately 10 parts by mass or greater, or approximately 15 parts by mass or greater, but approximately 200 parts by mass or less, approximately 180 parts by mass or less, or approximately 160 parts by mass or less, per 100 parts by mass of the tacky binder. By setting the content of the microspheres to be within the range described above, an uneven surface exhibiting excellent adhesion even to a rough surface can be formed on the first pressure sensitive adhesive layer.

In an embodiment, the mass ratio of the tacky binder to the microspheres in the first pressure sensitive adhesive layer is 40:60 or greater but 90:10 or less. By setting the mass ratio of the tacky binder to the microspheres to be within the range described above, an uneven surface exhibiting excellent adhesion even to a rough surface can be formed on the first pressure sensitive adhesive layer.

The first pressure sensitive adhesive layer may contain other optional components, such as fillers, colorants, UV absorbing agents, and antioxidants. These optional components can be dissolved or dispersed in the tacky binder. In an embodiment, the first pressure sensitive adhesive layer contains a white pigment such as titanium oxide. In this embodiment, the adherend surface can be concealed.

In an embodiment, the first pressure sensitive adhesive layer has an island structure including a cluster of the microspheres formed by aggregating a plurality of microspheres. In the present disclosure, a "cluster of microspheres" is a group formed by aggregation of two or more microspheres and is an aggregate of microspheres that form irregular shapes and irregular arrangement of protrusions on the first pressure sensitive adhesive layer. The cluster may contain a plurality of microspheres that are arranged in a planar direction of the adhesive sheet, may contain a plurality of microspheres that are stacked in the thickness direction of the adhesive sheet, or may contain a combination of these. The island structure formed with the cluster may contain a tacky binder. In the surroundings of the island structure, a "sea portion" that is relatively flat and that contains only the tacky binder and does not contain a cluster is present. FIGS. 1A and 1B illustrate an island structure in which the tacky binder 144 coats the clusters 146 formed by aggregation of a plurality of microspheres 142 and these clusters (three clusters in FIG. 1A) function as the tacky protrusions.

Since the microspheres in the clusters deform by pressure while the adhesive sheet is adhered to an adherend, the tacky protrusions deform into appropriate shapes to adhere to the adherend surface. The degree of deformation can be controlled by thickness and thickness of coating of the first pressure sensitive adhesive layer, compressive elastic modulus of microspheres, compounded ratio of the microspheres and the tacky binder, and the like.

In an embodiment, a cluster contains 2 or more, approximately 5 or more, or approximately 10 or more, but approximately 200 or less, approximately 150 or less, or approximately 100 or less microspheres. By setting the number of microspheres contained in the cluster to be within the range described above, unevenness of tackiness in the plane can be suppressed while conformity to the adherend surface is enhanced. Among all the clusters, preferably, 80% or more of the clusters contain the number of microspheres described above. The formation, shape, and size of the clusters of the microspheres in the first pressure sensitive adhesive layer can be observed typically at a magnification of 10 times to 100 times using a reflected light of an optical microscope.

The adhesive sheet can be formed by, for example, coating a surface of a rigid resin film or another layer on a rigid resin film which has been surface-treated as necessary with a pressure sensitive adhesive layer composition containing microspheres and a tacky binder, a solvent which is an optional component, other additives, and the like, and by drying the solvent as necessary. The preparation of the pressure sensitive adhesive layer composition can be performed by mixing components using a mixing device, such as a homomixer or a planetary mixer. The coating can be performed by, for example, a knife coater, a gravure coater, a roll coater, a die coater, or a bar coater. The drying of the solvent after the coating can be performed, for example, at a temperature of 60° C. to 120° C. for several tens of seconds to 10 minutes.

As the solvent, water, an organic solvent, or an aqueous solvent which is a mixture of these can be used. It is advantageous to use water or an aqueous solvent for cluster formation. Examples of the aqueous solvent include mixtures of water and an alkylene glycol monoalkyl ether ester, such as 3-methyl-3-methoxybutylacetate.

As the additive, publicly known additives can be used in a range that does not impair the effect of the present invention, and examples thereof include viscosity adjusting agents, antifoaming agents, leveling agents, UV absorbing agents, antioxidants, and pigments.

The dry coating weight of the pressure sensitive adhesive layer is typically approximately 15 $g/m^2$ or greater, approximately 20 $g/m^2$ or greater, or approximately 25 $g/m^2$ or greater, but approximately 200 $g/m^2$ or less, approximately 180 $g/m^2$ or less, or approximately 160 $g/m^2$ or less. By setting the dry coating weight to be within the range described above, the first pressure sensitive adhesive layer having excellent repositionability, while excellent adhesion is achieved, can be formed.

By adjusting the viscosity of the pressure sensitive adhesive layer composition and/or the wettability of a surface which is to be coated with the pressure sensitive adhesive layer composition, formation of clusters of the microspheres is promoted, and the shape, arrangement, and size of the clusters can be controlled. The microspheres are dispersed in the composition containing the solvent and the tacky binder and are transferred during the drying of the solvent since the microspheres are pulled by the tacky binder component dissolved in the solvent, and the microspheres aggregate to form a cluster.

From the perspective of promoting the cluster formation, it is advantageous to set the viscosity of the pressure sensitive adhesive layer composition to approximately 100 mPa·s or greater or approximately 150 mPa·s or greater but approximately 6000 mPa·s or less or approximately 5000 mPa·s or less.

The wettability of the surface to be coated with the pressure sensitive adhesive layer composition can be controlled in a manner that clusters are formed while the coating unevenness of the composition is suppressed by surface treatment such as corona discharge treatment, plasma treatment, primer treatment, or acid- or alkali-treatment, or by the type or amount of the additive(s) contained in the rigid resin film.

The surface of the first pressure sensitive adhesive layer may be protected by a release liner. Depending on the adhesive force of the first pressure sensitive adhesive layer, the surface of the release liner may be subjected to release treatment, or an untreated release liner may be used. For example, an untreated polyethylene film having a thickness of 80 to 200 micrometers can be used as the release liner.

In the case where the thickness of the first pressure sensitive adhesive layer is measured in a condition that a film is adhered to the first pressure sensitive adhesive layer surface so that the microspheres are deformed, the thickness of the first pressure sensitive adhesive layer is typically approximately 65 micrometers or greater, approximately 70 micrometers or greater, or approximately 75 micrometers or greater, but approximately 220 micrometers or less, approximately 200 micrometers or less, or approximately 180 micrometers or less. By setting the thickness of the first pressure sensitive adhesive layer to be within the range described above, adhesive force to an adherend surface can be enhanced.

Since the thickness in the plane of the uneven surface of the first pressure sensitive adhesive layer is not uniform, the first pressure sensitive adhesive layer has a maximum thickness and a minimum thickness. The minimum thickness of the first pressure sensitive adhesive layer is typically a thickness of the tacky binder region where no microspheres are contained. The difference between the maximum thickness and the minimum thickness of the first pressure sensitive adhesive layer is an indicator of topography (shape or characteristics of surface) of the uneven surface of the first pressure sensitive adhesive layer and particularly relates to adhesiveness to a rough surface. In some embodiments, the difference between the maximum thickness and the minimum thickness of the first pressure sensitive adhesive layer is approximately 50 micrometers or greater, approximately 70 micrometers or greater, or approximately 90 micrometers or greater, but approximately 400 micrometers or less, approximately 350 micrometers or less, or approximately 300 micrometers or less. By setting the difference between the maximum thickness and the minimum thickness of the first pressure sensitive adhesive layer to be within the range described above, the adhesive sheet can be adhered to, for example, a rough surface having protrusions with a height of 1 to 2 mm.

The 60 degree gloss of the uneven surface of the first pressure sensitive adhesive layer is another indicator showing topography of the uneven surface of the first pressure sensitive adhesive layer and particularly relates to adhesion to a rough surface. In some embodiments, the 60 degree gloss of the first pressure sensitive adhesive layer is approximately 3 or greater, approximately 4 or greater, or approximately 5 or greater, but approximately 60 or less, approximately 55 or less, or approximately 50 or less. By setting the 60 degree gloss of the first pressure sensitive adhesive layer to be within the range described above, the adhesive sheet can be adhered to, for example, a rough surface having protrusions with a height of 1 to 2 mm, by strong adhesive force. The 60 degree gloss is defined as a value measured in accordance with JIS Z8741.

In some embodiments, the thickness of the rigid resin film is approximately 0.2 times or greater, approximately 0.25 times or greater, or approximately 0.3 times or greater, but approximately 7 times or less, approximately 6.5 times or less, or approximately 6 times or less, of the volume average particle diameter of the microspheres. As a result of selecting the thickness of the rigid resin film to satisfy the condition described above, smoother appearance of the adhesive sheet can be maintained by sufficiently preventing the deformation of the adhesive sheet relative to the stress caused by the deformation of microspheres during application of adhesive sheet.

The adhesive sheet can be applied to an adherend surface by a publicly known method. During the application, the adhesive sheet may be pressed against the adherend surface by a roller or the like or may be pressed against the adherend surface by rubbing by hand. The adhesive sheet may be temporarily deformed during the application but can provide a smooth surface by allowing the adhesive sheet to recover its shape as time passes. In an embodiment, the adhesive sheet is applied to a rough surface, such as mortar and concrete, and provides smooth appearance after being applied.

The adhesive force of the adhesive sheet varies depending on the adherend surface, the adhesive force is, for example, approximately 0.5 N/25 mm or greater or approximately 1 N/25 mm or greater but approximately 50 N/25 mm or less or approximately 25 N/25 mm or less when indicated by 180 degree peel strength. Since the adhesive sheet has a rigid resin film, the adhesive sheet is less likely to be deformed in the bending direction, and force that is necessary to initiate the peeling of the adhesive sheet does not concentrate at the position where peeling is initiated. Thus, even when the 180 degree peel strength is small, the adhesive sheet can be held on the adherend surface. The 180 degree peel strength is defined as an adhesive force obtained by producing a test piece by cutting out an adhesive sheet into a rectangular shape having a width of 25 mm and a length of 150 mm, adhering the test piece onto an adherend surface at 20° C. in accordance with JIS Z 0237 8.2.3. and then leaving at 20° C. for 24 hours, and performing 180 degree peeling using a tensile tester at 20° C. at a peeling rate of 300 mm/min.

Although the shear force of a structure in which the adhesive sheet and an adherend are adhered to each other varies depending on the adherend surface, the shear force is, for example, approximately 0.05 MPa or greater or approximately 0.10 MPa or greater but approximately 1.5 MPa or less or approximately 1.0 MPa or less. The adhesive sheet can exhibit high shear force especially when the adhesive sheet is applied to a rough surface. Without wishing to be bound by any theory, this is because the uneven surface of the first pressure sensitive adhesive layer mates with the unevenness of the rough surface. High shear force is advantageous to prevent slipping caused by the weight of the adhesive sheet when the adhesive sheet is applied to a vertical surface. The shear force is defined as an adhesive force obtained by producing a test piece by cutting out an adhesive sheet into a rectangular shape having a width of 25 mm and a length of 60 mm, adhering the test piece onto an aluminum panel having a width of 25 mm, a length of 60 mm, and a thickness of 1 mm using a roller at 23° C. in a manner that the contact region is 25 mm×12 mm and then leaving at 20° C. for 24 hours, and performing a measurement using a tensile tester at 20° C. at a tensile speed of 50 mm/min.

The adhesive sheet of an embodiment has repositionability. The first pressure sensitive adhesive layer having an uneven surface due to the presence of the microspheres can impart repositionability to the adhesive sheet.

The adhesive sheet may further contain optional constituent(s), such as a surface-protecting layer provided on a surface or on another surface or above these of the rigid resin film, a decorative layer such as a printed layer and a metal vapor deposited layer, an adhesive layer that adheres these, and another additional resin film layer.

In an embodiment, the adhesive sheet contains a transparent resin film having a graphic image printed on the surface thereof.

The rigid resin film may have a second pressure sensitive adhesive layer on another surface thereof. Due to the second pressure sensitive adhesive layer, the rigid resin film can be adhered to the transparent resin film or another layer, such as a metal layer. The graphic image may be positioned in between the transparent resin film and the second pressure sensitive adhesive layer. By this, the graphic image can be protected by the transparent resin film.

Figure 3:
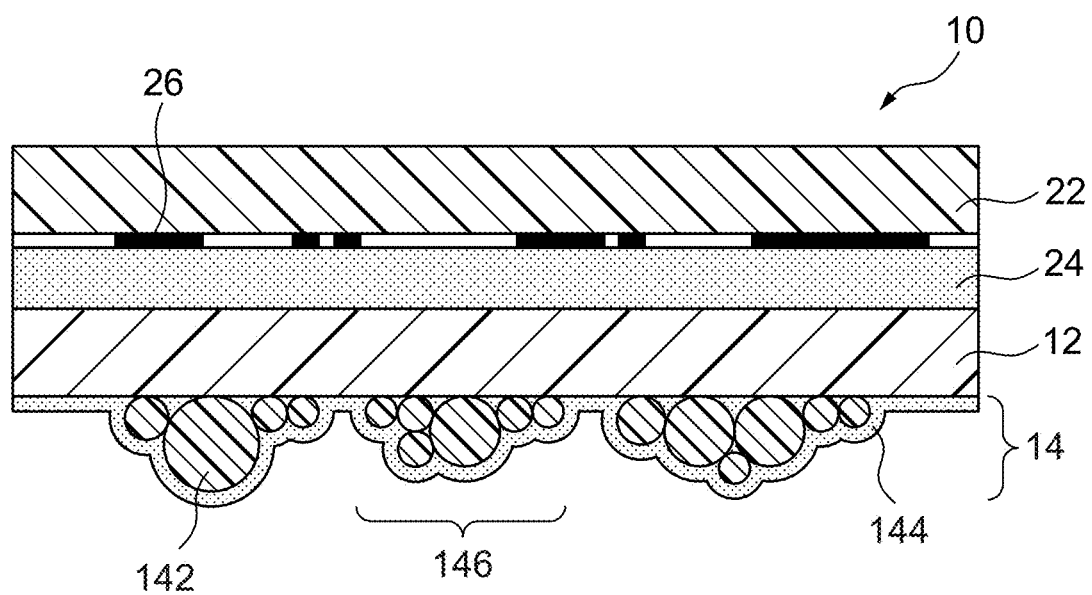
FIG. 3 is a schematic cross-sectional view of an adhesive sheet of another embodiment of the present disclosure.

FIG. 3 illustrates a schematic cross-sectional view of an adhesive sheet 10 of another embodiment of the present disclosure. The adhesive sheet 10 has a second pressure sensitive adhesive layer 24 provided on another surface of a rigid resin film 12 (top surface in FIG. 3), and a transparent resin film 22. A graphic image 26 is printed on a surface of the transparent resin film 22 (bottom surface in FIG. 3). The graphic image 26 is positioned in between the transparent resin film 22 and the second pressure sensitive adhesive layer 24.

The raw material of the transparent resin film is not particularly limited; however, examples thereof include polyvinyl chloride, polyvinylidene chloride, polyesters such as polyethylene terephthalate and polyethylene naphthalate, polyolefins such as polyethylene and polypropylene, polycarbonates, acrylic resins, and fluororesins such as polytetrafluoroethylene and polyvinylidene fluoride. From the perspective of achieving excellent weather resistance and transparency, an acrylic resin film is advantageously used as the transparent resin film.

Various thicknesses may be employed for the transparent resin film and, for example, the thickness can be approximately 25 micrometers or greater or approximately 40 micrometers or greater but approximately 500 micrometers or less or approximately 300 micrometers or less.

The transparent resin film may have undergone surface treatment, such as matte treatment, embossing treatment, primer treatment, corona treatment, and plasma treatment, for decorative purpose or the like. The transparent resin film may have a receptor layer on the surface thereof and may be a receptor film. By using a transparent resin film having a receptor layer or a transparent resin film being a receptor film, the graphic image can be directly formed on the transparent resin film by inkjet printing or the like. The transparent resin film may contain other optional components, such as fillers, colorants, UV absorbing agents, and antioxidants.

The transparent resin film may be colorless or may be colored. In some embodiments, the total light transmittance of the transparent resin film in the wavelength range of 400 to 700 nm is approximately 85% or greater or approximately 90% or greater. The total light transmittance in the present disclosure can be determined in accordance with JIS K 7361-1:1997 (ISO 13468-1:1996).

The graphic image may be a graphic image that has been printed on a transparent resin film using inkjet printing, screen printing, gravure printing, offset printing, electrostatic printing, and the like.

The second pressure sensitive adhesive layer can be formed by using a pressure sensitive adhesive composition containing a publicly know resin, such as an acrylic resin, polyurethane, polyolefin, polyester, rubber-based resin, silicone-based resin, or vinyl acetate-based resin. The second pressure sensitive adhesive layer may contain a tackifier or may be crosslinked. In an embodiment, the second pressure sensitive adhesive layer contains a white pigment such as titanium oxide. In this embodiment, the adherend surface can be concealed.

Various thicknesses may be employed for the second pressure sensitive adhesive layer and, for example, the thickness can be approximately 10 micrometers or greater, approximately 20 micrometers or greater, or approximately 30 micrometers or greater, but approximately 200 micrometers or less, or approximately 100 micrometers or less.

The adhesive sheet having such a graphic image can be produced by the following procedure. An adhesive sheet having a rigid resin film and a first pressure sensitive adhesive layer is prepared. Thereafter, as necessary, the surface of the rigid resin film or the surface of the other layer on the rigid resin film is surface-treated, and a pressure sensitive adhesive layer composition is applied on the surface and dried to form a second pressure sensitive adhesive layer. The graphic image is printed on one surface of the transparent resin film using inkjet printing, screen printing, gravure printing, or the like. The transparent resin film and the adhesive sheet are laminated in a manner that the graphic image-printed surface of the transparent resin film and the second pressure sensitive adhesive layer face each other. As necessary, backing may be arranged on the unprinted surface of the transparent resin film, and a release liner may be arranged on the first pressure sensitive adhesive layer. As necessary, to enhance the adhesive properties between the second pressure sensitive adhesive layer and the transparent resin film, corona treatment, primer treatment, or the like may be performed on the surface of the transparent resin film.

The adhesive sheet having a graphic image can be produced by the following procedure. A second pressure sensitive adhesive layer is formed on a surface of a rigid resin film, and a release liner is adhered onto the second pressure sensitive adhesive layer. Thereafter, a first pressure sensitive adhesive layer is formed on the opposite surface of the rigid resin film, and a release liner is adhered onto the first pressure sensitive adhesive layer. After the release liner on the second pressure sensitive adhesive layer is removed, the transparent resin film on which the graphic image has been printed is laminated on the second pressure sensitive adhesive layer.

Figure 4:
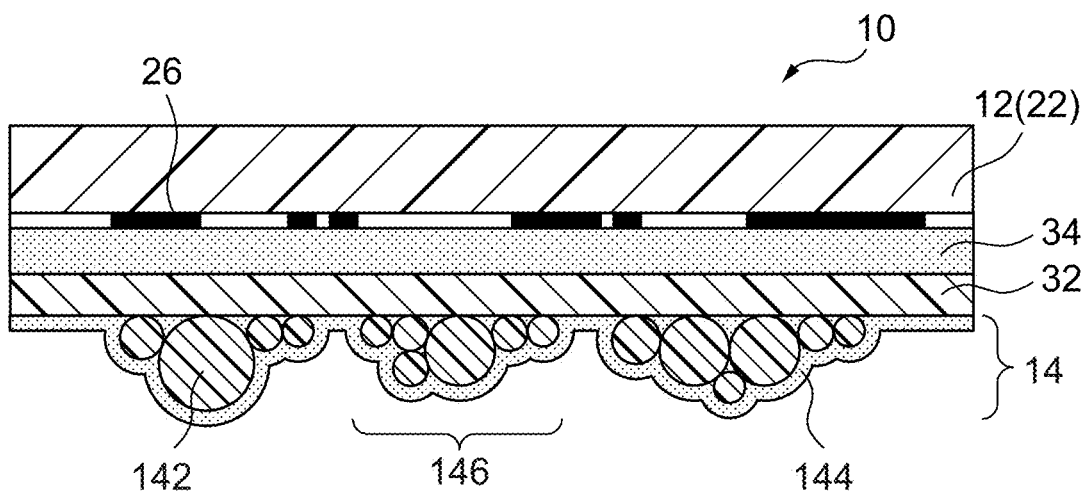
FIG. 4 is a schematic cross-sectional view of an adhesive sheet of yet another embodiment of the present disclosure.

The transparent resin film may be a rigid resin film. FIG. 4 illustrates a schematic cross-sectional view of an adhesive sheet 10 of yet another embodiment of the present disclosure. The adhesive sheet 10 has a rigid resin film 12 which is also a transparent resin film 22, a graphic image 26 printed on the rigid resin film 12, an adhesive layer 34, an additional resin film layer 32, and a first pressure sensitive adhesive layer 14. The adhesive layer 34 may be a layer similar to the second pressure sensitive adhesive layer, and may contain a white pigment such as titanium oxide. Examples of the additional resin film layer include films of polyvinyl chloride, polyvinylidene chloride, polyesters such as polyethylene terephthalate and polyethylene naphthalate, polyolefins such as polyethylene and polypropylene, polycarbonates, acrylic resins, and fluororesins such as polytetrafluoroethylene and polyvinylidene fluoride. Various thicknesses may be employed as the thickness thereof and, for example, the thickness can be approximately 25 micrometers or greater or approximately 40 micrometers or greater but approximately 500 micrometers or less or approximately 300 micrometers or less. The transparent resin film and the additional resin film may function together as a rigid resin film by setting the total thickness of these films to be 80 micrometers or greater and 500 micrometers or less.

The rigid resin film may have a receptor layer on the surface thereof and may be a receptor film. In an embodiment, the receptor layer or the receptor film contains an acrylic resin. By using a rigid resin film having a receptor layer or a rigid resin film being a receptor film, the graphic image can be directly formed on the rigid resin film by inkjet printing or the like. The receptor layer may be laminated on the rigid resin film via an adhesive layer.

Figure 5:
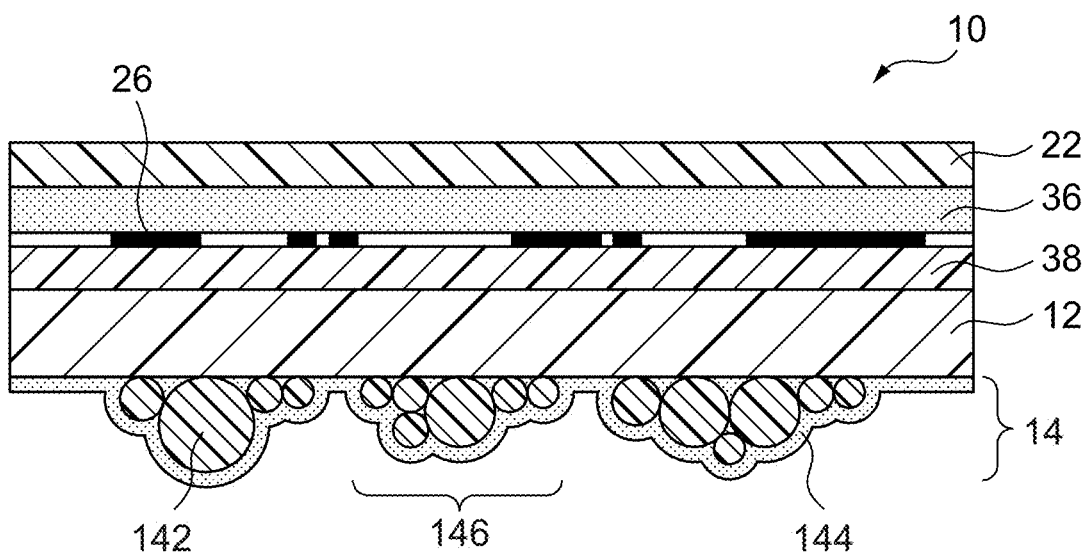
FIG. 5 is a schematic cross-sectional view of an adhesive sheet of yet another embodiment of the present disclosure.

FIG. 5 illustrates a schematic cross-sectional view of an adhesive sheet 10 of yet another embodiment of the present disclosure. The adhesive sheet 10 has a transparent resin film 22, a transparent adhesive layer 36, a graphic image 26, a receptor layer 38 that receives the graphic image 26, a rigid resin film 12, and a first pressure sensitive adhesive layer 14. The transparent adhesive layer 36 may be a layer similar to the second pressure sensitive adhesive layer as long as the layer is transparent.

Figure 6:
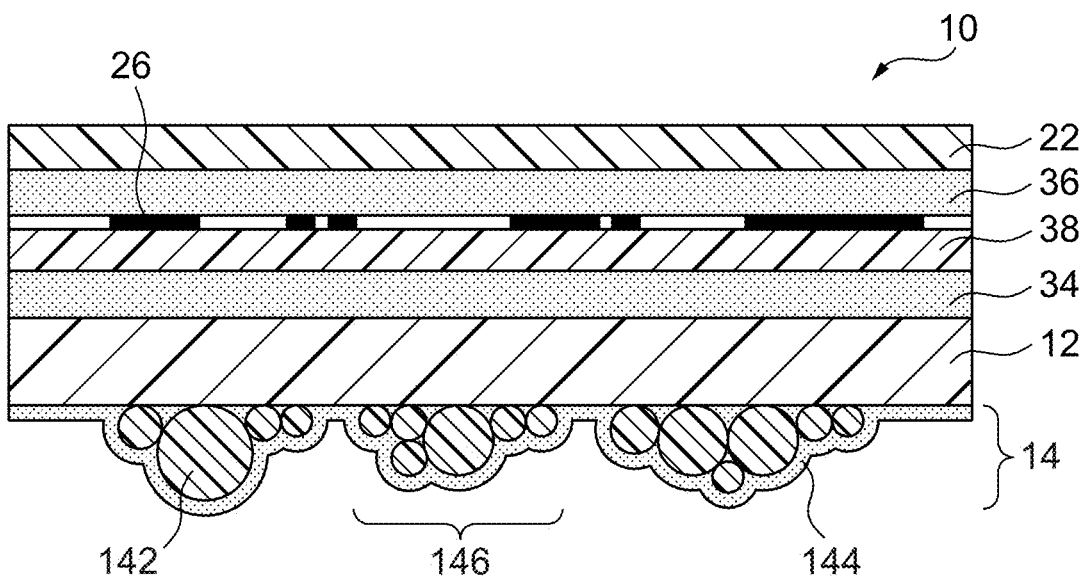
FIG. 6 is a schematic cross-sectional view of an adhesive sheet of yet another embodiment of the present disclosure.

FIG. 6 illustrates a schematic cross-sectional view of an adhesive sheet 10 of yet another embodiment of the present disclosure. The adhesive sheet 10 has a transparent resin film 22, a transparent adhesive layer 36, a graphic image 26, a receptor layer 38 that receives the graphic image 26, an adhesive layer 34, a rigid resin film 12, and a first pressure sensitive adhesive layer 14. The adhesive layer 34 may be a layer similar to the second pressure sensitive adhesive layer, and may contain a white pigment such as titanium oxide. The transparent adhesive layer 36 may be a layer similar to the second pressure sensitive adhesive layer as long as the layer is transparent. The receptor layer 38 may be a transparent acrylic resin film.

The adhesive sheet may further include a metal layer. The use of the metal layer imparts low combustibility, flame retardance, or nonflammability (hereinafter, referred together as "nonflammability") to the adhesive sheet. Without wishing to be bound by any theory, it is considered that the entire adhesive sheet can be made nonflammable because the metal layer itself has high nonflammability and at least a part of the components of the adhesive sheet can be protected or shielded from flame, heat, oxygen, and the like.

The metal layer may contain, for example, aluminum, aluminum alloy, steel, steel alloy, copper, copper alloy, titanium, titanium alloy, or a combination of two or more types of these. The metal layer may be a laminate of a plurality of metal layers. In an embodiment, the metal layer is used in a form of a metal foil or a metal sheet. From the perspective of availability and excellent nonflammability, the metal layer preferably contains aluminum or steel. From the perspective of achieving practical nonflammability at low cost, the metal layer more preferably contains aluminum.

In some embodiments, the thickness of the metal layer may be approximately 8 micrometers or greater, approximately 10 micrometers or greater, or approximately 15 micrometers or greater, approximately 200 micrometers or less, approximately 150 micrometers or less, or approximately 100 micrometers or less. By setting the thickness of the metal layer to approximately 8 micrometers or greater, excellent nonflammability can be achieved. By setting the thickness of the metal layer to approximately 200 micrometers or less, unnecessary increase in the production cost of the adhesive sheet can be avoided.

When the metal layer contains aluminum, the thickness of the metal layer may be set to approximately 12 micrometers or greater, approximately 15 micrometers or greater, or approximately 25 micrometers or greater, and superior nonflammability can be achieved by setting the thickness to approximately 30 micrometers or greater, approximately 40 micrometers or greater, or approximately 50 micrometers or greater.

In an embodiment, the metal layer is arranged on the other face of the rigid resin film or above the other face of the rigid resin film. That is, the metal layer is arranged on a face opposite to the face where the first pressure sensitive adhesive layer of the rigid resin film is arranged. The metal layer is arranged in direct contact with the face or arranged with another layer interposed therebetween. In this embodiment, when the adhesive sheet is applied to a base material, the rigid resin film is positioned in between the metal layer and the base material. Therefore, due to the presence of the metal layer, the rigid resin film, which has a relatively large thickness and is easily burned among components of the adhesive sheet, is effectively protected or shielded from flame, heat, oxygen, and the like, and thus the adhesive sheet can be imparted with high nonflammability.

Figure 7:
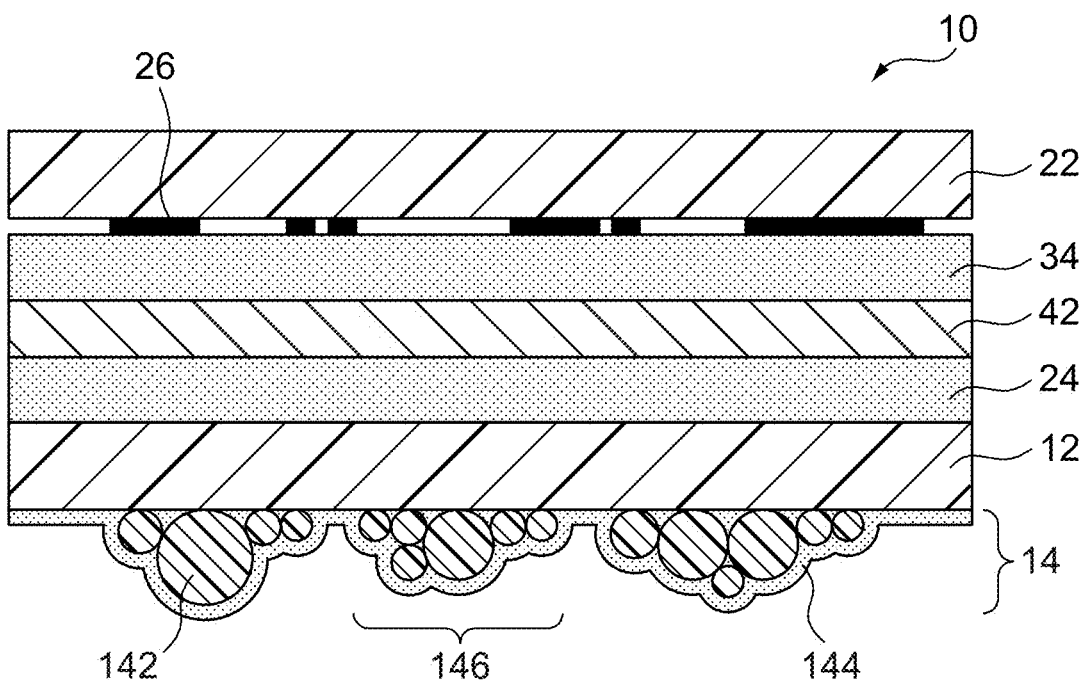
FIG. 7 is a schematic cross-sectional view of an adhesive sheet of yet another embodiment of the present disclosure.

FIG. 7 illustrates a schematic cross-sectional view of an adhesive sheet 10 of yet another embodiment of the present disclosure. The adhesive sheet 10 has a first pressure sensitive adhesive layer 14 arranged on one face of the rigid resin film 12 (bottom face in FIG. 7) and a metal layer 42 arranged above the other face of the rigid resin film 12 (upper face in FIG. 7). The metal layer 42 is adhered to the rigid resin film 12 through the second pressure sensitive adhesive layer 24. The adhesive sheet 10 further has a transparent resin film 22 above the other face of the rigid resin film 12, and a graphic image 26 is printed on a surface of the transparent resin film 22 (bottom face in FIG. 7). The transparent resin film 22 is adhered to the metal layer 42 through the adhesive layer 34, and the graphic image 26 is positioned in between the transparent resin film 22 and the adhesive layer 34. When the adhesive sheet 10 is applied to a base material, the rigid resin film 12 is positioned in between the metal layer 42 and the base material. The metal layer 42 protects or shields the rigid resin film 12 from flame, heat, oxygen and the like to which the outermost surface of the adhesive sheet 10 (upper face of the transparent resin film 22 in FIG. 7) is first exposed, and thus the spread of the fire to the rigid resin film 12, which has a relatively large thickness and is easily burned, can be prevented or suppressed. The adhesive layer 34 may be a layer similar to the second pressure sensitive adhesive layer 24, and may contain a white pigment such as titanium oxide.

In an embodiment, the adhesive layer arranged in between the metal layer and the decorative layer (in FIG. 7, the adhesive layer 34 arranged in between the metal layer 42 and the graphic image 26) contains a white pigment such as titanium oxide. In this embodiment, the color tone of the metal layer can be concealed, and the design of the decorative layer can be maintained or enhanced.

In some embodiments, the total calorific value of the adhesive sheet having the metal layer is, for example, approximately 10 MJ/m$^2$ or less, preferably approximately 8 MJ/m$^2$ or less, and more preferably approximately 6 MJ/m$^2$ or less, in 20 minutes total. The total calorific value in the present disclosure can be measured by using the cone calorimetry in accordance with ISO 5660-1. According to the value of standard for fire protection materials, when the total calorific value is 8 MJ/m$^2$ or less in 5 minutes total, the adhesive sheet is classified as a fire retardant material; when the total calorific value is 8 MJ/m$^2$ or less in 10 minutes total, the adhesive sheet is classified as a quasi-noncombustible material; and when the total calorific value is 8 MJ/m$^2$ or less in 20 minutes total, the adhesive sheet is classified as a noncombustible material.

By making the thickness of the adhesive sheet having nonflammability even smaller, the nonflammability can be further enhanced. In some embodiments, the thickness of the adhesive sheet having nonflammability can be set to approximately 500 micrometers or less, approximately 300 micrometers or less, or approximately 150 micrometers or less.

The layer constituting the adhesive sheet may contain a nonflammable additive. Examples of the nonflammable additive include bromine compounds, phosphorus compounds, chlorine compounds, antimony compounds, metal hydroxides, and nitrogen compounds. As the bromine compound, pentabromodiphenyl ether, octabromodiphenyl ether, decabromodiphenyl ether (DBDPE, DBDPO), tetrabromo bisphenol A (TBBPA), hexabromocyclododecane (HBCD), hexabromobenzene, and the like can be used. As the phosphorus compound, aromatic phosphate such as triphenyl phosphate, red phosphorus, and phosphate having halogen, can be used. As the chlorine compound, chlorinated paraffin and the like can be used. As the antimony compound, antimony trioxide, antimony pentoxide, and the like can be used. As the metal hydroxide, aluminum hydroxide, magnesium hydroxide, and the like can be used. As the nitrogen compound, melamine cyanurate and the like can be used. The compounded amount of the nonflammable additive can be appropriately selected in a range that does not impair characteristics that are desired for the adhesive sheet, such as adhesion, design, and transparency.

The adhesive sheet can be used for various purposes and on various surfaces. An example thereof includes a graphic sheet used to be adhered to a wall, floor, or ceiling of a building or the like. In particular, the adhesive sheet is advantageously applied to any case where the adhesive sheet is applied to a smooth surface, a surface that is covered with mortar, concrete, wallpaper, or the like, a surface that has a large degree of unevenness, or a surface having irregular shape and size of the unevenness.

The adhesive sheet can be also suitably used as a graphic sheet for an illuminated sign. The adhesive sheet used for an illuminated sign has a region that transmits at least a part of light from lighting positioned on the back side of the adhesive sheet. Decoration that can be observed when the light is turned off and turned on can be imparted to the illuminated sign when the adhesive sheet is adhered on a panel of the illuminated sign made from glass, plastics, and the like. When the adhesive sheet has repositionability, the adhesive sheet, which has become unnecessary, can be easily removed from the illuminated sign, and a new adhesive sheet can be adhered to the illuminated sign as necessary.

In some embodiments, the total light transmittance of the adhesive sheet may be approximately 5% or greater, approximately 7% or greater, or approximately 10% or greater, and approximately 90% or less, approximately 60% or less, or approximately 30% or less, as an average of the entire face of the adhesive sheet.

EXAMPLES

The raw materials used in the production of the adhesive sheet are shown in Table 1.

TABLE 1

| Material | Composition or description | Manufacturer | Solvent | Solid content (%) |
|---|---|---|---|---|
| Elastic resin microspheres 1 (LSA 1) | 2EHA:AA:1,4-BDA = 94:6:0.025 Volume average particle diameter (Dv) 200 micrometers | — | Water | 35 |
| Elastic resin microspheres 2 (LSA 2) | 2EHA:AA:1,4-BDA = 94:6:0.025 Volume average particle diameter (Dv) 220 micrometers | — | Water | 35 |

TABLE 1-continued

| Material | Composition or description | Manufacturer | Solvent | Solid content (%) |
|---|---|---|---|---|
| Elastic resin microspheres 3 (LSA 3) | 2EHA:AA:1,4-BDA = 94:6:0.025 Volume average particle diameter (Dv) 153 micrometers | — | Water | 35 |
| Elastic resin microspheres 4 (LSA 4) | 2EHA:AA:1,4-BDA = 94:6:0.025 Volume average particle diameter (Dv) 204 micrometers | — | Water | 35 |
| Elastic resin microspheres 5 (LSA 5) | 2EHA:AA:1,4-BDA = 94:6:0.025 Volume average particle diameter (Dv) 133 micrometers | — | Water | 35 |
| Elastic resin microspheres 6 (LSA 6) | 2EHA:AA:1,4-BDA = 94:6:0.025 Volume average particle diameter (Dv) 174 micrometers | — | Water | 35 |
| Elastic resin microspheres 7 (MSA 1) | IOA:AA:1,4-BDA = 94:6:0.025 Volume average particle diameter (Dv) 32 micrometers | — | Water | 35 |
| Inelastic microspheres 1 (MS 1) | Chemisnow (trade name) MZ-30H, inelastic solid microspheres, volume average particle diameter Dv 30 micrometers, crosslinked acrylic polymer | Soken Chemical & Engineering Co., Ltd. (Toshima-ku, Tokyo, Japan) | — | 100 |
| Adhesive (A1) | SK-Dyne E-313, acrylic adhesive | Soken Chemical & Engineering Co., Ltd. (Toshima-ku, Tokyo, Japan) | Water | 55 |
| Crosslinking agent (CL1) | Epoxy-based crosslinking agent E-AX | Soken Chemical & Engineering Co., Ltd. (Toshima-ku, Tokyo, Japan) | Toluene | 5 |
| Polyester film 1 (PET 1) | Cosmoshine (trade name) A4300 Oriented polyester film having thickness of 188 micrometers | Toyobo Co., Ltd. (Osaka-shi, Osaka, Japan) | — | — |
| Polyester film 2 (PET 2) | Cosmoshine (trade name) A4300 Oriented polyester film having thickness of 100 micrometers | Toyobo Co., Ltd. (Osaka-shi, Osaka, Japan) | — | — |
| Polyester film 3 (PET 3) | Cosmoshine (trade name) A4300 Oriented polyester film having thickness of 75 micrometers | Toyobo Co., Ltd. (Osaka-shi, Osaka, Japan) | — | — |
| Polyester film 4 (PET 4) | Cosmoshine (trade name) A4300 Oriented polyester film having thickness of 50 micrometers | Toyobo Co., Ltd. (Osaka-shi, Osaka, Japan) | — | — |
| Polyolefin film 1 (PO 1) | POViC, Unoriented polyolefin film having thickness of 300 micrometers | Achilles Corporation (Shinjuku-ku, Tokyo, Japan) | — | — |
| Polyolefin film 2 (PO 2) | Unoriented polyolefin film having thickness of 300 micrometers | 3M Japan Limited (Shinagawa-ku, Tokyo, Japan) | — | — |

2EHA: 2-ethylhexyl acrylate
AA: acrylic acid
1,4-BDA: 1,4-butanediol diacrylate

Preparation of elastic resin microspheres 1 - LSA 1

The elastic resin microspheres 1 (LSA 1) were prepared by the following procedure. In a 1 L glass flask equipped with a baffle plate, 1.5 g of polyvinyl alcohol (degree of saponification: approximately 88 mol %; viscosity: approximately 44 mPa·s; pH: approximately 6) and 279 g of deionized water were charged. The temperature of the mixture was increased to 45° C. using an IR stirrer and the mixture was mixed by the stirrer. After the particles of the polyvinyl alcohol are completely dissolved in water, a premix that was placed in ajar and that contained 141 g of 2-ethylhexyl acrylate, 9 g of acrylic acid, and 0.0375 g of 1,4-butanediol diacrylate was poured into the flask. The mixture was stirred by an impeller blade having a size of 45 mm at a stirring rate of 350 rpm, and the flask was heated again to 45° C. while a nitrogen gas was bubbled into the mixture. At the time when the temperature reached 45° C., 0.45 g of 2,2'-azobis(2,4-dimethylvaleronitrile) (AVN) was added to the mixture. The polymerization had been initiated in approximately 1 hour after the AVN was added, and the temperature had been increased along with the exothermic reaction. After the temperature increase was stopped, the temperature setting was raised to 65° C. and this temperature was maintained for 3 hours after the initiation of the polymerization. Thereafter, the mixture was cooled, and the obtained polymer suspension was filtered through a #16 metal mesh. The volume average particle diameter of the obtained microspheres was measured by using a laser diffraction particle size analyzer, Beckman Coulter LS230. The volume average particle diameter of the LSA 1 was approximately 200 micrometers. The viscoelasticity measurement of the LSA 1 was performed using the RSA II viscoelasticity spectrometer, manufactured by Rheometrics (Advanced Rheometric Expansion System (ARES)). The shear storage modulus at 25° C. was $7 \times 10^5$ dyn/cm$^2$, and the compressive elastic modulus was approximately $2.3 \times 10^4$ Pa.

Preparation of Elastic Resin Microspheres 2 - LSA 2

The LSA 2 was prepared by the same procedure as for the LSA 1 except for changing all the amounts of the raw materials to the amounts that are 1.5 times the amounts for LSA 1. The volume average particle diameter of the LSA 2 was approximately 220 micrometers.

Preparation of Elastic Resin Microspheres 3 - LSA 3

The LSA 3 was prepared by the same procedure as for the LSA 2 except for changing the stirring rate from 350 rpm to 425 rpm. The volume average particle diameter of the LSA 3 was approximately 153 micrometers.

Preparation of Elastic Resin Microspheres 4 - LSA 4

The LSA 4 was prepared by the same procedure as for the LSA 1 except for changing all the amounts of the raw materials to the amounts that are 10 times the amounts for LSA 1 and changing the stirring rate to 153 rpm. The volume average particle diameter of the LSA 4 was approximately 204 micrometers.

Preparation of Elastic Resin Microspheres 5 - LSA 5

The LSA 5 was prepared by the same procedure as for the LSA 1 except for changing the polyvinyl alcohol to a polyvinyl alcohol having a degree of saponification of approximately 88 mol %, viscosity of approximately 95 mPa·s, and pH of approximately 6 and changing the stirring rate to 457 rpm. The volume average particle diameter of the LSA 5 was approximately 133 micrometers.

Preparation of Elastic Resin Microspheres 6 - LSA 6

The LSA 6 was prepared by the same procedure as for the LSA 5 except for changing the stirring rate to 401 rpm. The volume average particle diameter of the LSA 6 was approximately 174 micrometers.

Preparation of Elastic Resin Microspheres 7 - MSA 1

The elastic resin microspheres 7 (MSA 1) were prepared by the following procedure. In a 1 L glass flask equipped with a baffle plate, 9.66 g of NEOPELEX G-15 (Kao Corporation (Chuo-ku, Tokyo, Japan)) and 279 g of deionized water were charged. The temperature of the mixture was increased to 45° C. using an IR stirrer and the mixture was mixed by the stirrer. A premix that was placed in a jar and that contained 141 g of isooctyl acrylate, 9 g of acrylic acid, and 0.0375 g of 1,4-butanediol diacrylate was poured into the flask. The mixture was stirred by an impeller blade having a size of 45 mm at a stirring rate of 450 rpm, and the flask was heated again to 45° C. while a nitrogen gas was bubbled into the mixture. At the time when the temperature reached 45° C., 0.45 g of 2,2'-azobis(2,4-dimethylvaleronitrile) (AVN) was added to the mixture. The polymerization had been initiated in approximately 1 hour after the AVN was added, and the temperature had been increased along with the exothermic reaction. After the temperature increase was stopped, the temperature setting was raised to 65° C. and this temperature was maintained for 3 hours after the initiation of the polymerization. Thereafter, the mixture was cooled, and the obtained polymer suspension was filtered through a #16 metal mesh. The volume average particle diameter of the obtained microspheres was measured by using a laser diffraction particle size analyzer, Beckman Coulter LS230. The volume average particle diameter of the MSA 1 was approximately 32 micrometers.

Example 1

A first pressure sensitive adhesive layer solution was prepared by mixing LSA 1 and an adhesive A1. The mass ratio, in terms of solid content, of the LSA 1 to the A1 was 50:100 (33:67). The solid content of the first pressure sensitive adhesive layer solution was approximately 46%. The first pressure sensitive adhesive layer solution and the crosslinking agent CL1 were mixed. The mass ratio, in terms of solid content, of the A1 to the CL1 was 100:0.09. The mixture was applied on a polyester film 1 (PET 1) by a knife coater. The coated first pressure sensitive adhesive layer was dried at 95° C. for 5 minutes. The thickness of the first pressure sensitive adhesive layer after the drying was 114 micrometers, and the surface of the first pressure sensitive adhesive layer had a concavo-convex shape. The dry coating weight of the first pressure sensitive adhesive layer was 42 g/m$^2$. The uneven surface of the first pressure sensitive adhesive layer and the release liner (untreated polyethylene film; thickness: 100 micrometers) were adhered to each other. A white pressure sensitive adhesive layer having a thickness of 30 micrometers formed by using an adhesive composition prepared in accordance with the method described in Example 1 of JP 2014-172320 A was laminated on the opposite face of the first pressure sensitive adhesive layer of the PET 1. A transparent acrylic film that was laminated on a polyester carrier and that had a thickness of 50 micrometers was prepared. After inkjet printing was performed using a solvent inkjet ink on an exposed face of the transparent acrylic film, the printed surface and the white pressure sensitive adhesive layer were adhered to each other. The polyester carrier was then released to obtain an adhesive sheet of Example 1.

Example 2

An adhesive sheet of Example 2 was produced in the same manner as in Example 1 except for changing the dry coating weight of the first pressure sensitive adhesive layer to 72 g/m$^2$.

Example 3

An adhesive sheet of Example 3 was produced in the same manner as in Example 1 except for changing the dry coating weight of the first pressure sensitive adhesive layer to 91 g/m$^2$.

Example 4

An adhesive sheet of Example 4 was produced in the same manner as in Example 1 except for changing the dry coating weight of the first pressure sensitive adhesive layer to 110 g/m$^2$.

Example 5

An adhesive sheet of Example 5 was produced in the same manner as in Example 1 except for changing the dry coating weight of the first pressure sensitive adhesive layer to 142 g/m$^2$.

Example 6

An adhesive sheet of Example 6 was produced in the same manner as in Example 1 except for changing the mass ratio of the LSA 1 to the A1, in terms of solid content ratio, to 100:100 (50:50) and changing the dry coating weight of the first pressure sensitive adhesive layer to 114 g/m$^2$.

Example 7

An adhesive sheet of Example 7 was produced in the same manner as in Example 6 except for changing the dry coating weight of the first pressure sensitive adhesive layer to 150 g/m$^2$.

Example 8

An adhesive sheet of Example 8 was produced in the same manner as in Example 1 except for changing the LSA 1 to the LSA 2 and changing the dry coating weight of the first pressure sensitive adhesive layer to 38 g/m².

Example 9

An adhesive sheet of Example 9 was produced in the same manner as in Example 8 except for changing the dry coating weight of the first pressure sensitive adhesive layer to 39 g/m².

Example 10

An adhesive sheet of Example 10 was produced in the same manner as in Example 8 except for changing the dry coating weight of the first pressure sensitive adhesive layer to 54 g/m².

Example 11

An adhesive sheet of Example 11 was produced in the same manner as in Example 1 except for changing the LSA 1 to the LSA 3 and changing the dry coating weight of the first pressure sensitive adhesive layer to 20 g/m².

Example 12

An adhesive sheet of Example 12 was produced in the same manner as in Example 11 except for changing the dry coating weight of the first pressure sensitive adhesive layer to 79 g/m².

Example 13

An adhesive sheet of Example 13 was produced in the same manner as in Example 11 except for changing the dry coating weight of the first pressure sensitive adhesive layer to 80 g/m².

Example 14

An adhesive sheet of Example 14 was produced in the same manner as in Example 1 except for changing the PET 1 to a polyester film 2 (PET 2) having a thickness of 100 micrometers and changing the dry coating weight of the first pressure sensitive adhesive layer to 75 g/m².

Example 15

An adhesive sheet of Example 15 was produced in the same manner as in Example 1 except for changing the PET 1 to a polyolefin film 2 (PO 2) having a thickness of 300 micrometers and changing the dry coating weight of the first pressure sensitive adhesive layer to 75 g/m².

Example 16

An adhesive sheet of Example 16 was produced in the same manner as in Example 1 except for changing the LSA 1 to the LSA 4 and changing the dry coating weight of the first pressure sensitive adhesive layer to 41 g/m².

Example 17

An adhesive sheet of Example 17 was produced in the same manner as in Example 16 except for changing the dry coating weight of the first pressure sensitive adhesive layer to 67 g/m².

Example 18

An adhesive sheet of Example 18 was produced in the same manner as in Example 16 except for changing the dry coating weight of the first pressure sensitive adhesive layer to 88 g/m².

Example 19

An adhesive sheet of Example 19 was produced in the same manner as in Example 1 except for changing the LSA 1 to the LSA 5 and changing the dry coating weight of the first pressure sensitive adhesive layer to 41 g/m².

Example 20

An adhesive sheet of Example 20 was produced in the same manner as in Example 19 except for changing the dry coating weight of the first pressure sensitive adhesive layer to 52 g/m².

Example 21

An adhesive sheet of Example 21 was produced in the same manner as in Example 1 except for changing the LSA 1 to the LSA 6 and changing the dry coating weight of the first pressure sensitive adhesive layer to 65 g/m².

Example 22

An adhesive sheet of Example 22 was produced in the same manner as in Example 21 except for changing the dry coating weight of the first pressure sensitive adhesive layer to 80 g/m².

Example 23

An adhesive sheet of Example 23 was produced in the same manner as in Example 21 except for changing the dry coating weight of the first pressure sensitive adhesive layer to 99 g/m².

Comparative Example 1

A pressure sensitive adhesive solution was prepared by mixing the MSA 1 and A1. The mass ratio, in terms of solid content, of the MSA 1 to A1 was 25:100 (20:80). The solid content of the pressure sensitive adhesive solution was approximately 46%. The pressure sensitive adhesive solution and the CL1 were mixed. The mass ratio, in terms of solid content, of the A1 to CL1 was 100:0.09. The mixture was applied on a PET 1 by a knife coater. The coated pressure sensitive adhesive layer was dried at 95° C. for 5 minutes. The thickness of the pressure sensitive adhesive layer after the drying was 16 micrometers, and the surface of the pressure sensitive adhesive layer had a concavo-convex shape. The dry coating weight of the pressure sensitive adhesive layer was 18 g/m². The uneven surface of the pressure sensitive adhesive layer and the release liner (untreated polyethylene film; thickness: 100 micrometers) were adhered to each other. A white pressure sensitive adhesive layer having a thickness of 30 micrometers that was used in Example 1 was laminated on the opposite face of the pressure sensitive adhesive layer of the PET 1. A transparent acrylic film that was laminated on a polyester carrier and that had a thickness of 50 micrometers was prepared. After inkjet printing was performed using a solvent inkjet ink on an exposed face of the transparent acrylic film, the printed surface and the white pressure sensitive adhesive layer were adhered to each other. The polyester carrier was then released to obtain an adhesive sheet of Comparative Example 1.

Comparative Example 2

An adhesive sheet of Comparative Example 2 was produced in the same manner as in Example 1 except for using a double-sided adhesive tape KRT-15 (3M Japan Limited (Shinagawa-ku, Tokyo, Japan) as the pressure sensitive adhesive layer.

Comparative Example 3

An adhesive sheet of Comparative Example 3 was produced in the same manner as in Example 1 except for using an acrylic foam double-sided adhesive tape VHB 4481MH (3M Japan Limited (Shinagawa-ku, Tokyo, Japan) as the pressure sensitive adhesive layer.

Comparative Example 4

An adhesive sheet of Comparative Example 4 was produced in the same manner as in Example 1 except for changing the PET 1 to a polyolefin film 1 (PO 1) having a thickness of 300 micrometers and changing the dry coating weight of the pressure sensitive adhesive layer to 69 g/m².

Comparative Example 5

An adhesive sheet of Comparative Example 5 was produced in the same manner as in Example 1 except for changing the PET 1 to a polyester film 3 (PET 3) having a thickness of 75 micrometers and changing the dry coating weight of the pressure sensitive adhesive layer to 75 g/m².

Comparative Example 6

An adhesive sheet of Comparative Example 6 was produced in the same manner as in Example 1 except for changing the PET 1 to a polyester film 4 (PET 4) having a thickness of 50 micrometers and changing the dry coating weight of the pressure sensitive adhesive layer to 75 g/m2.

Comparative Example 7

An adhesive sheet of Comparative Example 7 was produced in the same manner as in Example 1 except for changing the LSA 1 to the MS 1, changing the added amount of the MS 1 to 30 parts by mass, and changing the dry coating weight to 19 g/m².

Comparative Example 8

An adhesive sheet of Comparative Example 8 was produced in the same manner as in Comparative Example 7 except for changing the dry coating weight to 28 g/m².

Example 24

An image receptor film in which a transparent acrylic film having a thickness of 30 micrometers was laminated on one surface of a PET 1 was prepared. After inkjet printing was performed using a solvent inkjet ink on the transparent acrylic film, a white pressure sensitive adhesive layer of Comparative Example 6 was adhered thereto to obtain an adhesive sheet of Example 24.

The pressure sensitive adhesive layer, the rigid resin film, and the adhesive sheet were tested and evaluated by the following procedure.

Thickness

The pressure sensitive adhesive layer surface of the sample was adhered to a polyester film having a thickness of 50 micrometers and used as a test piece. The thickness of the entire test piece was measured using the TH-104 Thickness Gauge, manufactured by Tester Sangyo Co., Ltd. The thickness obtained by subtracting the thickness of parts excluding the pressure sensitive adhesive layer from the thickness of the entire test piece was used as the thickness of the pressure sensitive adhesive layer. The measurements of the thickness were performed at three points, and the average value was used as the representative value.

Difference Between Maximum Thickness and Minimum Thickness

The sample was cut into a size of approximately 50 mm×approximately 25 mm, and the pressure sensitive adhesive layer surface was exposed by removing the liner. The pressure sensitive adhesive layer surface was observed by OPTELICS HYBRID microscope, manufactured by Lasertec Corporation, and the difference between the maximum thickness and the minimum thickness of the pressure sensitive adhesive layer was measured. The observation magnification was 20 times.

60 Degree Gloss

The 60 degree gloss of the pressure sensitive adhesive layer surface was measured by Portable Gloss Meter GMX-202, manufactured by Murakami Color Research Laboratory. The measurements of the gloss were performed at three points, and the average value was used as the representative value.

Yield Modulus

A test piece was produced by cutting a resin film into a rectangular shape with a width of 15 mm and a length of 100 mm. Using a tensile tester (Tensilon universal testing machine, model: RTC-1210A, manufactured by A&D Company, Limited (Toshima-ku, Tokyo, Japan)), the elongation properties of the test piece was measured in accordance with JIS K 7127 under the condition at 20° C., the distance between grips of 50 mm, at the tensile speed of 300 mm/min. The elastic modulus at the yield point was used as the yield modulus.

Tensile Strength at 2% Strain

A test piece was produced by cutting a resin film into a rectangular shape with a width of 25 mm and a length of 100 mm. Using a tensile tester (Tensilon universal testing machine, model: RTC-1210A, manufactured by A&D Company, Limited (Toshima-ku, Tokyo, Japan)), the tensile strength at 2% strain at 20° C. was measured under the condition at 20° C., the distance between grips of 50 mm, at the tensile speed of 300 mm/min.

Appearance 1

Test pieces were produced by cutting an adhesive sheet into approximately 150 mm×approximately 150 mm squares. Each of the test pieces was adhered on each of a melamine-coated panel (Paltek Corporation (Hiratsuka-shi, Kanagawa, Japan)), a mortar panel (Paltek Corporation (Hiratsuka-shi, Kanagawa, Japan)), and a DI-NOC (trade name) PS-959 film (3M Japan Limited (Shinagawa-ku, Tokyo, Japan)) at 23° C. using a roller. The appearance was evaluated as "excellent" in the case where the surface of the test piece on the base material was flat when visually observed. The appearance was evaluated as "poor" in the case where the surface of the test piece on the base material was rough when visually observed. The appearance was evaluated as "fail" in the case where peeling of the test piece on the DI-NOC (trade name) PS-959 film was visually observed.

Appearance 2

A test piece was produced by cutting an adhesive sheet into an approximately 150 mm×approximately 150 mm square. The test piece was adhered on a stucco-coated panel (Paltek Corporation (Hiratsuka-shi, Kanagawa, Japan)) at 23° C. using a roller. The stucco-coated panel on which the test piece was adhered was held vertically at 23° C. for 48 hours. The appearance was evaluated as "excellent" in the case where the surface of the test piece on the base material was flat when visually observed. The appearance was evaluated as "poor" in the case where the surface of the test piece on the base material was rough when visually observed. The appearance was evaluated as "fail" in the case where peeling of the test piece on the stucco-coated panel was visually observed.

Adhesive Force

Test pieces were produced by cutting a test piece into a rectangular shape with a width of 25 mm and a length of 150 mm. Each of the test pieces was adhered on each of a melamine-coated panel, a mortar panel, and a DI-NOC (trade name) PS-959 film at 23° C. The adhering method was in accordance with JIS Z 0237 8.2.3. The test piece was left at 20° C. for 24 hours. Using a tensile tester (Tensilon universal testing machine, model: RTC-1210A, manufactured by A&D Company, Limited (Toshima-ku, Tokyo, Japan)), the adhesive force at the time of performing 180 degree peeling was measured at a peeling rate of 300 mm/min at 20° C.

Air Releasability

A test piece was produced by cutting an adhesive sheet into an approximately 150 mm×approximately 150 mm square. The test piece was adhered on a melamine-coated panel (Paltek Corporation (Hiratsuka-shi, Kanagawa, Japan)) at 23° C. using a roller. The air releasability was evaluated as being "excellent" in the case where air bubbles were not observed in the interface between the base material and the test piece. The air releasability was evaluated as being "poor" in the case where air bubbles were observed in the interface between the base material and the test piece.

Removability from Mortar Panel

A test piece was produced by cutting a test piece into a rectangular shape with a width of 25 mm and a length of 150 mm. The test piece was adhered on a mortar panel (Paltek Corporation (Hiratsuka-shi, Kanagawa, Japan)) at 23° C. using a roller. The test piece was left at 23° C. for 48 hours. In the case where pressure sensitive adhesive residue was not observed on the mortar panel when the test piece was removed, the removability was evaluated as "excellent". In the case where the pressure sensitive adhesive residue was slightly observed on the mortar panel but was easily washed off using isopropanol, the removability was evaluated as "good". In the case where it was difficult to remove the test piece from the mortar panel, the removability was evaluated as "poor". "Excellent" and "good" are practically acceptable.

Removability from DI-NOC (Trade Name) Film

A test piece was produced by cutting a test piece into a rectangular shape with a width of 25 mm and a length of 150 mm. The test piece was adhered on a DI-NOC (trade name) PS-959 film at 23° C. using a roller. The test piece was left at 23° C. for 48 hours. In the case where pressure sensitive adhesive residue was not observed on the DI-NOC (trade name) PS-959 film when the test piece was removed, the removability was evaluated as "excellent". In the case where the pressure sensitive adhesive residue was slightly observed on the DI-NOC (trade name) PS-959 film but was easily washed off using isopropanol, the removability was evaluated as "good". In the case where it was difficult to remove the test piece from the DI-NOC (trade name) PS-959 film, the removability was evaluated as "poor". "Excellent" and "good" are practically acceptable. The surface roughness of the DI-NOC (trade name) PS-959 film was approximately 50 micrometers.

Shear Force

A test piece was produced by cutting a test piece into a rectangular shape with a width of 25 mm and a length of 60 mm. The test piece was adhered onto an aluminum panel having a width of 25 mm, a length of 60 mm, and a thickness of 1 mm using a roller at 23° C. in a manner that the contact region is 25 mm×12 mm. The test piece was left at 20° C. for 24 hours. Using a tensile tester (Tensilon universal testing machine, model: RTC-1210A, manufactured by A&D Company, Limited (Toshima-ku, Tokyo, Japan)), shear force was measured under the condition at 20° C. at a tensile speed of 50 mm/min. The average value of the shear forces obtained by measuring two test pieces (N=2) was used as a representative value.

The details of the produced adhesive sheets are shown in Table 2, and the evaluation results are shown in Table 3. In Table 3, the items that were not evaluated are shown as "ND".

TABLE 2

| | | First pressure sensitive adhesive layer | | | | | | Rigid resin film | | | | |
|---|---|---|---|---|---|---|---|---|---|---|---|---|
| | Elastic resin microspheres | Volume average particle diameter (micrometers) | Compounded amount (part by mass) | Dry coating weight (g/m$^2$) | Thickness (micrometers) | Difference between maximum thickness and minimum thickness (micrometers) | 60 Degree gloss | Film type | Thickness (micrometers) | Yield modulus (MPa) | Yield modulus × thickness (×10$^4$ N/m) | Tensile strength at 2% strain (N/25 mm) |
| Example 1 | LSA 1 | 200 | 50 | 42 | 114 | 100 | 41 | PET 1 | 188 | 115 | 2.16 | 347 |
| Example 2 | LSA 1 | 200 | 50 | 72 | 123 | 166 | 15 | PET 1 | 188 | 115 | 2.16 | 347 |
| Example 3 | LSA 1 | 200 | 50 | 91 | 132 | 165 | 10 | PET 1 | 188 | 115 | 2.16 | 347 |

TABLE 2-continued

| | | Volume average particle diameter (micrometers) | Compounded amount (part by mass) | Dry coating weight (g/m²) | Thickness (micrometers) | Difference between maximum thickness and minimum thickness (micrometers) | 60 Degree gloss | Film type | Thickness (micrometers) | Yield modulus (MPa) | Yield modulus × thickness (×10⁴ N/m) | Tensile strength at 2% strain (N/25 mm) |
|---|---|---|---|---|---|---|---|---|---|---|---|---|
| Example 4 | LSA 1 | 200 | 50 | 110 | 148 | 155 | 11 | PET 1 | 188 | 115 | 2.16 | 347 |
| Example 5 | LSA 1 | 200 | 50 | 142 | 164 | 148 | 9 | PET 1 | 188 | 115 | 2.16 | 347 |
| Example 6 | LSA 1 | 200 | 100 | 114 | 134 | 180 | 11 | PET 1 | 188 | 115 | 2.16 | 347 |
| Example 7 | LSA 1 | 200 | 100 | 150 | 162 | 260 | 12 | PET 1 | 188 | 115 | 2.16 | 347 |
| Example 8 | LSA 2 | 220 | 50 | 38 | 112 | 224 | 49 | PET 1 | 188 | 115 | 2.16 | 347 |
| Example 9 | LSA 2 | 220 | 50 | 39 | 113 | 167 | 43 | PET 1 | 188 | 115 | 2.16 | 347 |
| Example 10 | LSA 2 | 220 | 50 | 54 | 118 | 203 | 44 | PET 1 | 188 | 115 | 2.16 | 347 |
| Example 11 | LSA 3 | 153 | 50 | 20 | 95 | 157 | 35 | PET 1 | 188 | 115 | 2.16 | 347 |
| Example 12 | LSA 3 | 153 | 50 | 79 | 103 | 136 | 11 | PET 1 | 188 | 115 | 2.16 | 347 |
| Example 13 | LSA 3 | 153 | 50 | 80 | 107 | 130 | 8 | PET 1 | 188 | 115 | 2.16 | 347 |
| Example 14 | LSA 1 | 200 | 50 | 75 | 121 | 174 | 19 | PET 2 | 100 | 111 | 1.11 | 186 |
| Example 15 | LSA 1 | 200 | 50 | 75 | 120 | 151 | 21 | PO 2 | 300 | 11 | 0.33 | 48 |
| Example 16 | LSA 4 | 204 | 50 | 41 | 81 | 135 | 35 | PET 1 | 188 | 115 | 2.16 | 347 |
| Example 17 | LSA 4 | 204 | 50 | 67 | 100 | 140 | 29 | PET 1 | 188 | 115 | 2.16 | 347 |
| Example 18 | LSA 4 | 204 | 50 | 88 | 122 | 144 | 15 | PET 1 | 188 | 115 | 2.16 | 347 |
| Example 19 | LSA 5 | 133 | 50 | 41 | 76 | 74 | 12 | PET 1 | 188 | 115 | 2.16 | 347 |
| Example 20 | LSA 5 | 133 | 50 | 52 | 82 | 119 | 6 | PET 1 | 188 | 115 | 2.16 | 347 |
| Example 21 | LSA 6 | 174 | 50 | 65 | 96 | 163 | 25 | PET 1 | 188 | 115 | 2.16 | 347 |
| Example 22 | LSA 6 | 174 | 50 | 80 | 114 | 149 | 9 | PET 1 | 188 | 115 | 2.16 | 347 |
| Example 23 | LSA 6 | 174 | 50 | 99 | 129 | 160 | 8 | PET 1 | 188 | 115 | 2.16 | 347 |
| Example 24 | LSA 1 | 200 | 50 | 75 | 116 | 157 | 19 | PET 1 | 188 | 115 | 2.16 | 347 |
| | | | | Pressure sensitive adhesive layer | | | | | Rigid resin film | | | |
| | Elastic resin microspheres | Volume average particle diameter (micrometers) | Compounded amount (part by mass) | Dry coating weight (g/m²) | Thickness (micrometers) | Difference between maximum thickness and minimum thickness (micrometers) | 60 Degree gloss | Film type | Thickness (micrometers) | Yield modulus (MPa) | Yield modulus × thickness (×10⁴ N/m) | Tensile strength at 2% strain (N/25 mm) |
| Comparative Example 1 | (MSA 1) | 32 | 25 | 18 | 16 | 7 | 36 | PET 1 | 188 | 115 | 2.16 | 347 |
| Comparative Example 2 | None | None | 0 | 560 | 500 | 2 | 88 | PET 1 | 188 | 115 | 2.16 | 347 |
| Comparative Example 3 | None | None | 0 | 862 | 1000 | 6 | 39 | PET 1 | 188 | 115 | 2.16 | 347 |
| Comparative Example 4 | LSA 1 | 200 | 50 | 69 | 108 | 196 | 23 | PO 1 | 300 | 6 | 0.18 | 19 |
| Comparative Example 5 | LSA 1 | 200 | 50 | 75 | 118 | 120 | 19 | PET 3 | 75 | 111 | 0.83 | 156 |
| Comparative Example 6 | LSA 1 | 200 | 50 | 75 | 116 | 157 | 19 | PET 4 | 50 | 116 | 0.58 | 109 |
| Comparative Example 7 | MS 1 | 30 | 30 | 19 | 22 | ND | 11 | PET 1 | 188 | 115 | 2.16 | 347 |
| Comparative Example 8 | MS 1 | 30 | 30 | 28 | 24 | ND | 11 | PET 1 | 188 | 115 | 2.16 | 347 |

TABLE 3

| | Appearance 1 | Appearance 2 | Adhesive force (N/25 mm) | | | Air releasability | Removability | | Shear force (MPa) |
| | | | Melamine | Mortar | DI-NOC(TM) | Stucco | Mortar | DI-NOC(TM) | |
|---|---|---|---|---|---|---|---|---|---|
| Example 1 | Good | ND | 1 | 3 | 4 | ND | Good | Excellent | Excellent | 0.15 |
| Example 2 | Good | ND | 1 | 5 | 10 | ND | Good | Excellent | Excellent | 0.26 |
| Example 3 | Good | ND | 2 | 8 | 16 | ND | Good | Excellent | Excellent | 0.31 |
| Example 4 | Good | Good | 3 | 19 | 23 | 2 | Good | Excellent | Good | 0.22 |
| Example 5 | Good | ND | 5 | 22 | 32 | ND | Good | Excellent | Good | 0.23 |
| Example 6 | Good | Good | 3 | 23 | 23 | 1 | Good | Excellent | Good | 0.51 |
| Example 7 | Good | Good | 4 | 24 | 19 | 2 | Good | Excellent | Good | 0.50 |
| Example 8 | Good | ND | 1 | 2 | 2 | ND | Good | Excellent | Excellent | 0.15 |
| Example 9 | Good | ND | 1 | 3 | 5 | ND | Good | Excellent | Excellent | 0.16 |
| Example 10 | Good | ND | 1 | 4 | 7 | ND | Good | Excellent | Excellent | 0.21 |
| Example 11 | Good | ND | 1 | 5 | 7 | ND | Good | Excellent | Excellent | 0.31 |
| Example 12 | Good | ND | 2 | 13 | 14 | ND | Good | Excellent | Excellent | 0.61 |
| Example 13 | Good | ND | 3 | 19 | 22 | ND | Good | Excellent | Excellent | 0.65 |
| Example 14 | Good | Good | 3 | 10 | 14 | ND | Good | Excellent | Excellent | 0.45 |
| Example 15 | Good | Good | 6 | 18 | 22 | ND | Good | Excellent | Excellent | 0.32 |
| Example 16 | Good | Good | 1 | 3 | 4 | ND | Good | Excellent | Excellent | 0.25 |
| Example 17 | Good | Good | 2 | 5 | 8 | ND | Good | Excellent | Excellent | 0.36 |
| Example 18 | Good | Good | 3 | 9 | 15 | ND | Good | Excellent | Excellent | 0.49 |
| Example 19 | Good | Good | 1 | 6 | 8 | ND | Good | Excellent | Excellent | 0.40 |
| Example 20 | Good | Good | 5 | 16 | 28 | ND | Good | Excellent | Excellent | 0.41 |
| Example 21 | Good | Good | 1 | 4 | 5 | ND | Good | Excellent | Excellent | 0.29 |
| Example 22 | Good | Good | 2 | 8 | 14 | ND | Good | Excellent | Excellent | 0.48 |
| Example 23 | Good | Good | 3 | 11 | 20 | ND | Good | Excellent | Excellent | 0.59 |
| Example 24 | Good | Good | 5 | 12 | 19 | ND | Good | Excellent | Excellent | 0.37 |
| Comparative Example 1 | Good | Fail | 1 | 4 | 1 | 0 | Good | Excellent | Excellent | 1.05 |
| Comparative Example 2 | Good | Fail | 13 | 1 | 3 | 0 | Poor | Excellent | Excellent | 0.57 |
| Comparative Example 3 | Good | ND | 28 | 78 | 72 | ND | Poor | Poor | Poor | 0.31 |
| Comparative Example 4 | Poor | Poor | 3 | 14 | 21 | ND | Good | Excellent | Good | 0.26 |
| Comparative Example 5 | Poor | Poor | 3 | 12 | 17 | ND | Good | Excellent | Excellent | 0.42 |
| Comparative Example 6 | Poor | Poor | 5 | 12 | 19 | ND | Good | Excellent | Excellent | 0.37 |
| Comparative Example 7 | ND | ND | 0 | 0 | 0 | 0 | ND | ND | ND | 0 |
| Comparative Example 8 | ND | ND | 0 | 0 | 0 | 0 | ND | ND | ND | 0 |

Figure 8:
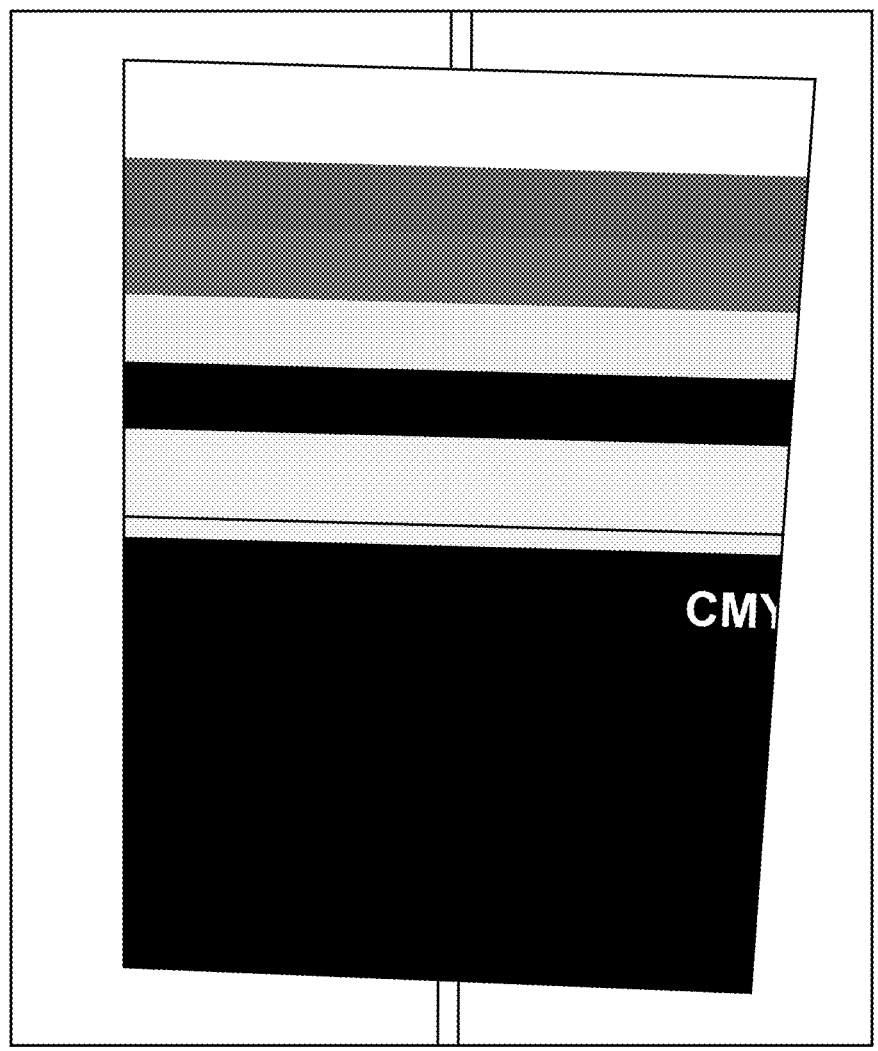
FIG. 8 is a picture of an adhesive sheet of Example 17 applied on a siding board.

FIG. 8 is a picture of an adhesive sheet of Example 17 applied on a siding board.

Example 25

The adhesive sheet of Example 1 was evaluated as a graphic film for an illuminated sign. The total light transmittance of the adhesive sheet was 13%. A test piece was produced by cutting an adhesive sheet into an approximately 300 mm×approximately 210 mm square. When the test piece was placed on an LED poster panel, Sky Light V (CAL Co., Ltd. (Shinjuku-ku, Tokyo, Japan)), a test piece can be easily adhered to the panel without air bubbles included in the interface between the panel and the test piece. The appearance when the LED lighting was turned off (appearance in daytime) was the same as the appearance when the adhesive sheet was placed on white paper, and the appearance when the LED lighting was turned on (appearance at night) was the same as the appearance in daytime.

Example 26

A first pressure sensitive adhesive layer solution was prepared by mixing LSA 1 and an adhesive A1. The mass ratio, in terms of solid content, of the LSA 1 to the A1 was 50:100 (33:67). The solid content of the first pressure sensitive adhesive layer solution was approximately 46%. The first pressure sensitive adhesive layer solution and the crosslinking agent CL1 were mixed. The mass ratio, in terms of solid content, of the A1 to the CL1 was 100:0.09. The mixture was applied on a polyester film 1 (PET 1) by a knife coater. The coated first pressure sensitive adhesive layer was dried at 95° C. for 5 minutes. The thickness of the first pressure sensitive adhesive layer after the drying was 114 micrometers, and the surface of the first pressure sensitive adhesive layer had a concavo-convex shape.

The dry coating weight of the first pressure sensitive adhesive layer was 42 g/m$^2$. The uneven surface of the first pressure sensitive adhesive layer and the release liner (untreated polyethylene film; thickness: 100 micrometers) were adhered to each other. A white pressure sensitive adhesive layer having a thickness of 30 micrometers that was used in Example 1 was laminated on the opposite face of the pressure sensitive adhesive layer of the PET 1 to produce a mounting component A.

An aluminum sheet having a thickness of 32 micrometers was prepared. A white pressure sensitive adhesive layer having a thickness of 30 micrometers that was used in Example 1 was laminated on the aluminum sheet to produce an aluminum component A.

A transparent acrylic film that was laminated on a polyester carrier and that had a thickness of 50 micrometers was prepared. Inkjet printing was performed on an exposed face of the transparent acrylic film by using a solvent inkjet ink to produce a printed component.

The mounting component A and the aluminum component A were laminated so that the white pressure sensitive adhesive layer of the mounting component A and the exposed face (face on which the white pressure sensitive adhesive layer was not laminated) of the aluminum component A face each other. The printed face of the printed component was faced and adhered to the white pressure sensitive adhesive layer of the aluminum component A. Then, the polyester carrier was peeled off, and an adhesive sheet of Example 26 having a laminate structure illustrated in FIG. 7 was obtained.

Example 27

An adhesive sheet of Example 27 was produced in the same manner as in Example 26 except for changing the thickness of the aluminum sheet from 32 micrometers to 50 micrometers.

Example 28

An adhesive sheet of Example 28 was produced in the same manner as in Example 26 except for changing the white pressure sensitive adhesive layers of the mounting component A and the aluminum component A to transparent pressure sensitive adhesive layers that had a thickness of 30 micrometers and that were formed by using a thermally crosslinkable adhesive which was described as ADH 5 in Table 2 of JP 2017-197604 A.

Flammability Test

The total calorific value of the adhesive sheet was evaluated by using the cone calorimetry in accordance with ISO 5660-1. A test piece was produced by cutting an adhesive sheet into a 100 mm×100 mm square and was then laminated on a 100 mm×100 mm square plasterboard having a thickness of 12.5 mm. The obtained laminate was horizontally placed onto the part for placing a sample of a cone calorimeter and was subjected to radiation heating of 50 kW/m$^2$ by using a cone-shaped electric heater placed above the laminate, and the test was performed for 20 minutes after the ignition caused by an electrical spark. The total calorific value was determined based on the consumed amount of oxygen by combustion gas analysis. The test was performed in a condition of N=2 or N=3, and the average of the obtained total calorific values was used as an index of nonflammability of the adhesive sheet. When the total calorific value was 8 MJ/m$^2$ or less in 5 minutes total, the adhesive sheet was a fire retardant material; when the total calorific value was 8 MJ/m$^2$ or less in 10 minutes total, the adhesive sheet was a quasi-noncombustible material; and when the total calorific value was 8 MJ/m$^2$ or less in 20 minutes total, the adhesive sheet was a noncombustible material. Furthermore, the time at which the heat release rate exceeded 200 kW/m$^2$ during the 20 minutes of the flammability test was recorded as the time for excessive heat generation. In the case where the time at which the heat release rate exceeded 200 kW/m$^2$, i.e. the time for excessive heat generation, was shorter than 10 seconds, the adhesive sheet was evaluated as a noncombustible material.

Appearance 3

A test piece was produced by cutting an adhesive sheet into a 70 mm×150 mm square. The test piece was adhered on a mortar panel (Paltek Corporation (Hiratsuka-shi, Kanagawa, Japan)) at 23° C. using a roller. The appearance was evaluated as "good" in the case where the surface of the test piece on the base material was flat when visually observed. The appearance was evaluated as "poor" in the case where the surface of the test piece on the base material was rough when visually observed.

The evaluation results of the adhesive sheets of Examples 26 to 28 are shown in Table 4. The evaluation results for the adhesive sheet of Example 1, which contained no metal layer, is also shown in Table 4 as a Reference Example 1.

TABLE 4

| | Aluminum layer | | Total calorific value of 20 minutes (mJ/m$^2$) | Time for excessive heat generation (sec) | Appearance 3 |
|---|---|---|---|---|---|
| | Thickness (micrometers) | Position | | | |
| Example 26 | 32 | In between the printed component and the mounting component | 6.7 | 0 | Good |
| Example 27 | 50 | In between the printed component and the mounting component | 4.2 | 0 | Good |
| Example 28 | 50 | In between the printed component and the mounting component | 2.7 | 1 | Good |
| Reference Example 1 | — | — | 12.9 | 23 | Good |

REFERENCE SIGNS LIST

10 Adhesive sheet
12 Rigid resin film
14 First pressure sensitive adhesive layer
142 Elastic resin microsphere
144 Tacky binder
146 Cluster
22 Transparent resin film
24 Second pressure sensitive adhesive layer
26 Graphic image
32 Additional resin film layer
34 Adhesive layer
36 Transparent adhesive layer
38 Receptor layer
42 Metal layer
200 Base material

What is claimed:
1. An adhesive sheet comprising:
a rigid resin film having a thickness of 80 micrometers to 500 micrometers and a yield modulus of 10 MPa to 300 MPa, wherein a product of the yield modulus and the thickness of the rigid resin film is 0.9×10$^4$ N/m to 5×10$^4$ N/m, and
a first pressure sensitive adhesive layer being disposed on or above a surface of the rigid resin film, wherein
the first pressure sensitive adhesive layer comprises elastic resin microspheres having a volume average particle diameter of 110 micrometers or greater and a tacky binder, and
the first pressure sensitive adhesive layer has an uneven surface due to the presence of the microspheres.
2. The adhesive sheet according to claim 1, further comprising:

a transparent resin film having a graphic image printed on a surface of the transparent resin film.

3. The adhesive sheet according to claim 2, further comprising a second pressure sensitive adhesive layer on another face of the rigid resin film.

4. The adhesive sheet according to claim 3, wherein the second pressure sensitive adhesive layer contains a white pigment.

5. The adhesive sheet according to claim 1, wherein the microspheres are tacky.

6. The adhesive sheet according to claim 1, wherein the microspheres have a compressive elastic modulus at 20° C. of 1 kPa to 100 kPa.

7. The adhesive sheet according to claim 1, wherein the rigid resin film has a tensile strength at 2% strain of 40 N/25 mm or greater.

8. The adhesive sheet according to claim 1, wherein the rigid resin film is a polyester film.

9. The adhesive sheet according to claim 1, wherein the thickness of the rigid resin film is 0.2 times the volume average particle diameter of the microspheres or greater.

10. The adhesive sheet according to claim 1, wherein the first pressure sensitive adhesive layer has an island structure comprising a cluster of the microspheres.

11. The adhesive sheet according to claim 1, wherein the first pressure sensitive adhesive layer has a 60 degree gloss of 50 or less on the uneven surface.

12. The adhesive sheet according to claim 1, wherein the difference between the maximum thickness and the minimum thickness of the first pressure sensitive adhesive layer is 50 micrometers or greater.

13. The adhesive sheet according to claim 1, wherein the tacky binder is an acrylic pressure sensitive adhesive.

14. The adhesive sheet according to claim 1, wherein the mass ratio of the tacky binder to the microspheres in the first pressure sensitive adhesive layer is from 40:60 to 90:10.

15. The adhesive sheet according to claim 1, further comprising a metal layer.

16. The adhesive sheet according to claim 15, wherein the metal layer is arranged on another face of the rigid resin film or above another face of the rigid resin film than the first pressure sensitive adhesive layer.

17. The adhesive sheet according to claim , wherein the rigid resin film is a transparent resin film having a graphic image printed on a surface of the transparent resin film.

18. A method of applying an adhesive sheet on a rough surface, the method comprising:
providing an adhesive sheet, the adhesive sheet comprising:
a rigid resin film having a thickness of 80 micrometers to 500 micrometers and a yield modulus of 10 MPa to 300 MPa, wherein a product of the yield modulus and the thickness of the rigid resin film is $0.9 \times 10^4$ N/m to $5 \times 10^4$ N/m, and
a first pressure sensitive adhesive layer being disposed on or above a surface of the rigid resin film, wherein
the first pressure sensitive adhesive layer comprises elastic resin microspheres having a volume average particle diameter of 110 micrometers or greater and a tacky binder, and
the first pressure sensitive adhesive layer has an uneven surface due to the presence of the microspheres; and
applying the adhesive sheet on a rough surface;
the adhesive sheet exhibiting a smooth appearance after being applied on the rough surface.

* * * * *

UNITED STATES PATENT AND TRADEMARK OFFICE
CERTIFICATE OF CORRECTION

PATENT NO. : 11,407,925 B2
APPLICATION NO. : 16/604104
DATED : August 9, 2022
INVENTOR(S) : Hidetoshi Abe It is certified that error appears in the above-identified patent and that said Letters Patent is hereby corrected as shown below:

In the Claims

<u>Column 34</u>
Line 10, In Claim 17, delete "claim" and insert -- claim 1 --, therefor.

Signed and Sealed this
Seventh Day of November, 2023

Katherine Kelly Vidal
*Director of the United States Patent and Trademark Office*